June 18, 1957 I. MOLNAR 2,796,466

TRAFFIC SUPERVISORY ARRANGEMENTS IN TELEPHONE SYSTEMS

Filed Feb. 15, 1954 4 Sheets-Sheet 1

INVENTOR.
IMRE MOLNAR

BY Wm. Walter Owen

ATTY.

June 18, 1957 I. MOLNAR 2,796,466

TRAFFIC SUPERVISORY ARRANGEMENTS IN TELEPHONE SYSTEMS

Filed Feb. 15, 1954 4 Sheets-Sheet 2

INVENTOR.
IMRE MOLNAR

BY Mc Watts Owen.

ATTY.

TRAFFIC SUPERVISORY ARRANGEMENTS IN TELEPHONE SYSTEMS

Filed Feb. 15, 1954 4 Sheets-Sheet 3

INVENTOR.
IMRE MOLNAR

BY [signature]

ATTY.

June 18, 1957 I. MOLNAR 2,796,466

TRAFFIC SUPERVISORY ARRANGEMENTS IN TELEPHONE SYSTEMS

Filed Feb. 15, 1954 4 Sheets-Sheet 4

INVENTOR.
IMRE MOLNAR

BY Wm. Walter Owen

ATTY.

2,796,466
Patented June 18, 1957

2,796,466

TRAFFIC SUPERVISORY ARRANGEMENTS IN TELEPHONE SYSTEMS

Imre Molnar, Chicago, Ill., assignor to General Telephone Laboratories, Incorporated, a corporation of Delaware Application February 15, 1954, Serial No. 410,353

22 Claims. (Cl. 179—27)

The invention relates to traffic supervisory arrangements in telephone systems and particularly to arrangements of this character employing switches of the camping type.

More specifically the invention relates to an arrangement for "camp-on-busy" selectors of the kind in which the calling party, usually an operator, receives a signal when all trunks in the desired group are busy, instructing the operator to camp, i. e. hold the connection; in which subsequently another signal, commonly referred to as a reorder signal, is transmitted to the operator as soon as a trunk in that group becomes available, advising the operator of this condition; and in which the operator thereupon releases the connection and then reoperates her calling device in another attempt to complete the connection over a trunk of the aforementioned group.

Such selectors thus are "camping-on-busy" in the sense that they enable an operator to camp on a busy group in wait for the receipt of a given signal. Automatic cut-in by selectors of this kind at the time a trunk becomes idle is usually not desirable as the operator may be busy with other calls at that particular moment, in which case the trunk in question would be prematurely rendered unavailable to other calls.

Camp-on-busy selectors of this general kind are advantageously used in connection with groups of trunks, such as toll trunks, which cannot be provided on too liberal a basis so that periods of greater or lesser traffic congestion must occasionally be expected in these groups. These camp-on-busy selectors, moreover, lend themselves well for use as intertoll selectors in tandem offices. For if used in such an office, these selectors permit to supply an operator in a remote originating office with information regarding the condition of the various groups of toll trunks outgoing from the tandem office.

In order to condition the camp-on-busy selectors for the transmission of the various signals there may be provided for each group of toll trunks a control circuit or apparatus, hereinafter termed group-busy control circuit, each of these control circuits being common to all selectors having access to the particular group of trunks.

One of the objects of the present invention resides in the provision of an arrangement facilitating the transmission of a maximum number of control or supervisory signals between the group-busy control circuit and the individual selectors or the calling operator with the expense for this purpose of a minimum of equipment in the selectors themselves.

Another object of the invention consists in the provision of novel and improved means for automatically limiting the number of switches that are permitted simultaneously to camp on a busy group.

Under certain conditions of extreme congestion in a given traffic direction it is desirable to enable a supervisory operator, for example the chief switchboard operator of the office in question, to temporarily bar a rank of selectors from access to the affected group of trunks even though one or more trunks in that group happen to be idle at the time a call is made. This is to prevent this particular call from seizing such a trunk in preference over other calls which may have been waiting for a considerable time to gain access to the group in question. The customary procedure under such a condition, known as "posted delay" working, is to inform the switchboard operators, for example by bulletins distributed to them at suitable intervals, of the delay to be expected in the particular traffic direction or directions. If necessary, the operator involved in the blocked call will pass this call on to a delay or call order operator who then attempts to complete the calls thus transferred to her at a later time and in the proper order.

It is a further object of the invention to provide novel and improved means for conditioning the selectors for posted delay operation and for facilitating the transmission of corresponding signals or intelligence to the calling operator over the switch train involved in the connection.

Another object of the invention is the provision of means enabling a calling operator, such as the above-mentioned delay operator, to condition the selector over the switch train involved in the connection for overriding the above-mentioned blocking condition, whereby the operator may gain access to an idle trunk if available in that group.

Yet another object of the invention resides in the provision of novel and improved means for selectively conditioning the group-busy control circuit for various types of operations.

According to one feature of the invention there is provided a camp-on-busy selector, preferably of the two-motion type, giving access to a plurality of trunk groups one or more of which may each have a separate group-busy control circuit associated therewith. The selector is first selectively moved to a preliminary position adjacent the desired group of trunks, and when all trunks in this group are busy or if a posted delay or blocking condition has been set up in this group, the selector is automatically advanced, over the positions corresponding to the trunks of this group, to an overflow position which in the case of a Strowger selector may be the eleventh rotary position in the selected level. Some or all of the banks of the selector switch are equipped with bank contacts in this overflow position also and as the group-busy control circuit is connected to these overflow position bank contacts a number of circuit paths including the switch wipers and bank contacts in the overflow position are available for the transmission of various control or supervisory signals from the group-busy control circuit to the selector or vice versa. The group-busy control circuit is also connected to a contact of the switch closed in the above-mentioned preliminary position, for example, the corresponding vertical bank contact in the case of a Strowger switch, and a discriminating relay in the selector controlled over this contact by the group-busy control circuit determines whether or not the selector switch on its automatic advancement is to be forced into the overflow position and what kind of operation is required after the switch has reached the overflow position.

According to another feature of the invention, when a selector has reached the overflow position due to the existence of an all-trucks-busy condition in the particular group a camping signal, i. e., a busy signal instructing the operator to camp is ordinarily returned from the group-busy control circuit to the operator by way of a selector wiper, this signal being subsequently replaced in the group-busy circuit by a reorder signal as soon as a trunk in this group becomes available. Also when the selector reaches the overflow position a camping potential such as ground is ordinarily connected through a marking resistance in the selector and over one of the switch wipers to a polarized relay in the group-busy circuit which serves to limit the number of selectors permitted to camp on the group in question. This relay is connected into a diagonal of a Wheatstone bridge the resistance value of one of whose arms is determined by the multiple connection of the marking resistances of all selectors that happen to be camping on this group at this time, while the resistance of another arm of this bridge may be selected at will, viz. in accordance with the setting of a manual selecting switch associated with the particular group-busy control circuit. The setting of this switch which may be located at the chief operator's position predetermines the number of multiple-connected marking resistances for which the bridge is at balance. When the number of camping selectors has become greater than corresponds to this condition of balance the polarized relay operates. As a result the discriminating relay of any selector subsequently set on this particular group is controlled, by way of the above-mentioned contact, to force this selector into the overflow position, cause a "master" or final busy signal to be returned to the operator in this position and prevent the connection of a marking potential to the polarized relay in the group-busy circuit. The term "master busy signal" or "final busy signal" as used herein denotes a signal instructing the operator to release the connection and attempt the completion of the call at a later time.

In accordance with a further feature of the invention the group-busy control circuit, additionally, may be selectively set up for a number of posted delay conditions. For this purpose the above-mentioned manual selecting switch has a number of further positions, each corresponding to a different time delay to be expected in this group. When this switch is set in any of the last-mentioned positions the discriminating relay of any selector subsequently set on this group is controlled as last described, whereby the selector switch is forced into its overflow position regardless of whether or not one or more trunks in the group happen to be idle at this particular moment. Again, a master busy signal is transmitted to the operator in the overflow position as explained above, and in addition a recorded announcement is transmitted from the group-busy circuit to the operator by way of the talking wipers of the selector in accordance with the particular setting of the manual switch, thereby informing the operator of the delay to be expected.

According to yet another feature, if the operator, e. g. the delay operator to whom the call has been transferred upon the receipt by the original operator of a posted delay announcement, wishes to attempt the completion of the call in spite of the fact that the group-busy circuit of the desired group is still set up for posted delay, she operates a cut-in or override key before setting up her key sender for the transmission of the required digital impulse series. Due to the operation of this cut-in key a circuit extending over the trunk incoming to the selector is closed upon seizure of the latter which circuit prevents the discriminating relay from forcing the selector, during its automatic advancement, into the overflow position. Therefore, if a trunk in the group happens to be idle at that time the selector is permitted to seize this trunk and the connection may then be completed over this trunk in the usual manner.

The invention both as to its organization and method of operation, together with other objects and features thereof, will best be understood by reference to the following specification taken in connection with the accompanying drawings. In these drawings.

Figure 2:
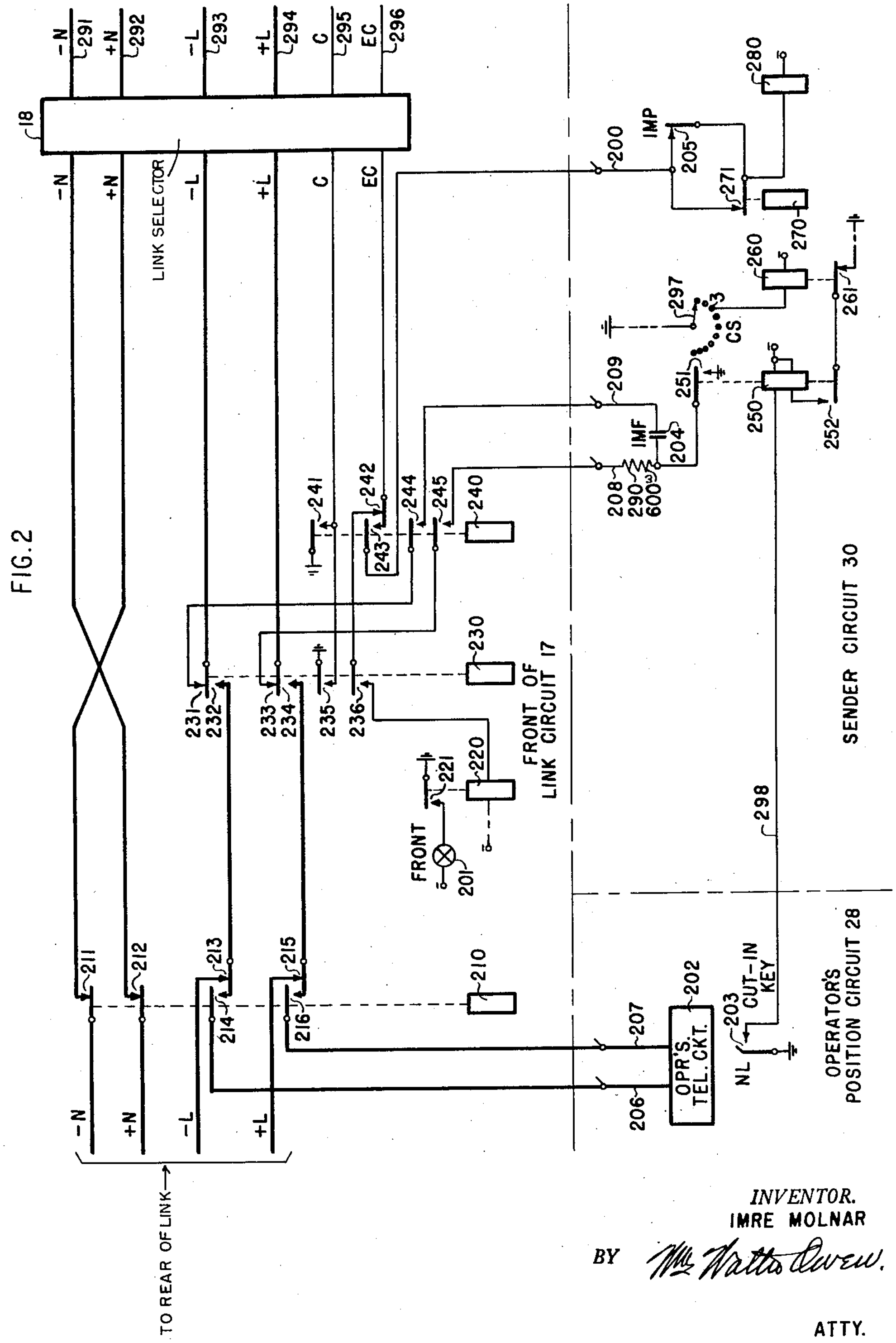
Fig. 2 is a schematic diagram of part of a link circuit, operator's position circuit and sender circuit associated with the dial toll board, Fig. 1.
Figure 3:
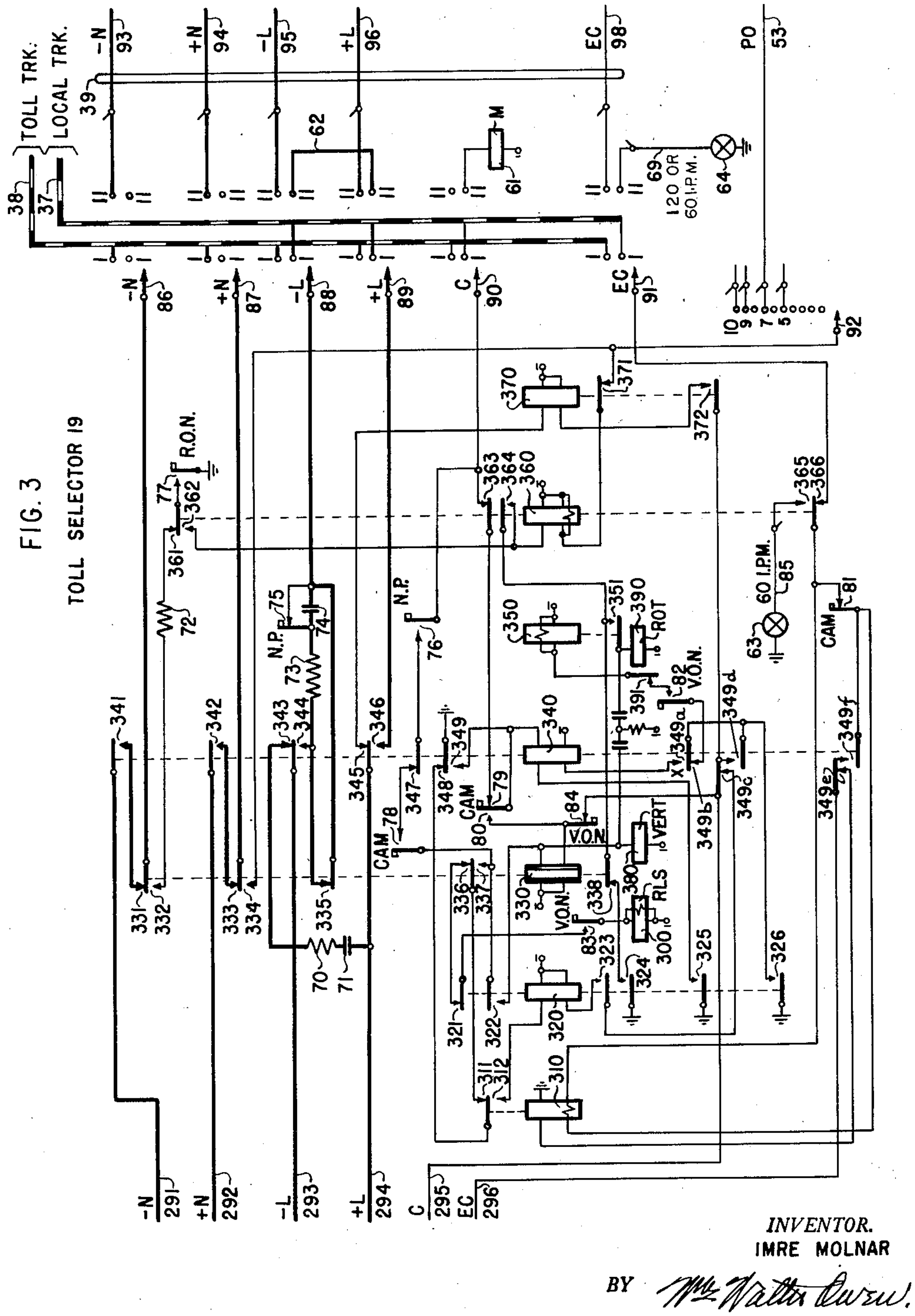
Fig. 3 is the circuit diagram of one of the camp-on-busy type toll selectors according to the invention.
Figure 4:
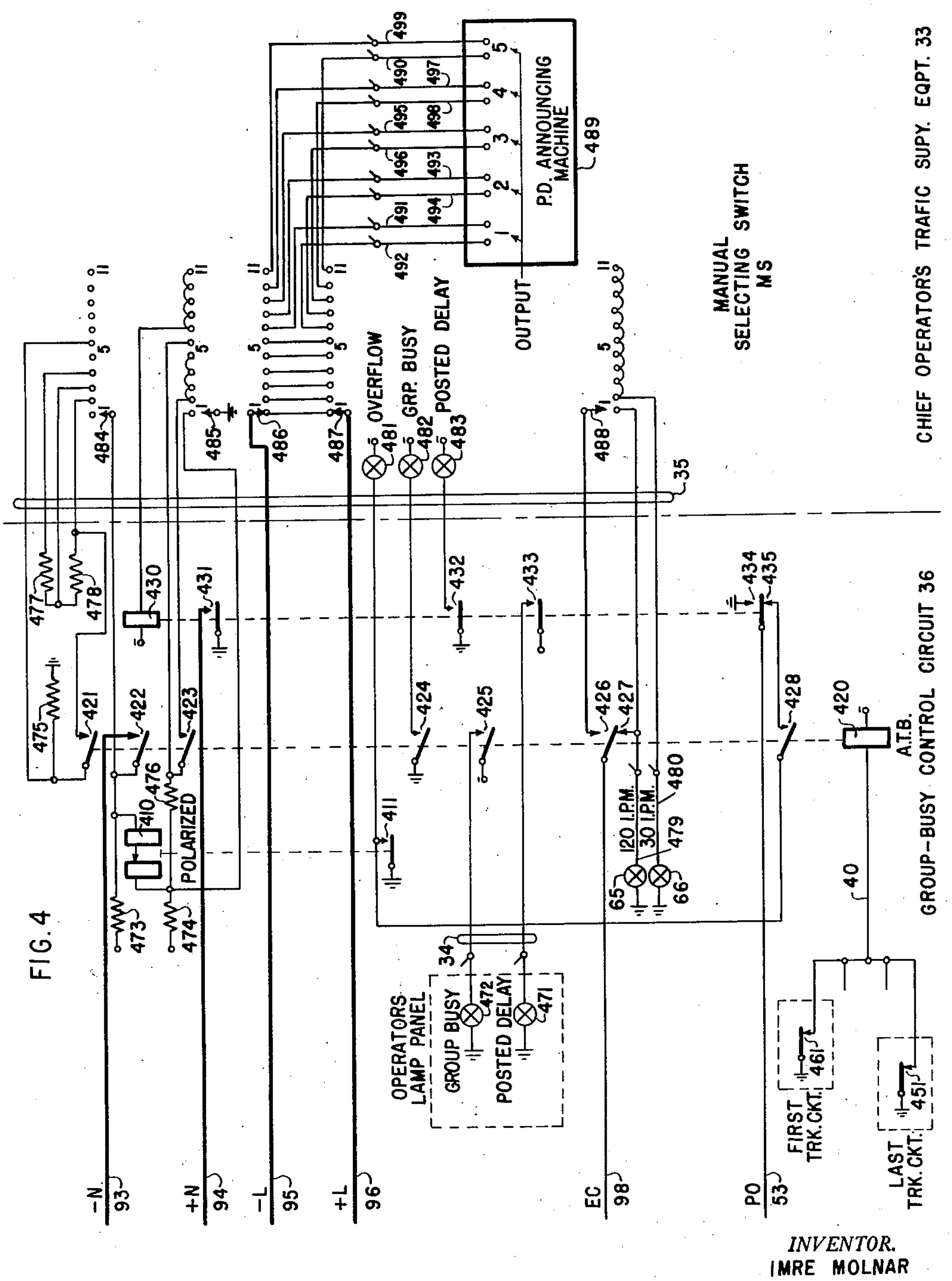
Fig. 4 is the circuit diagram of a group-busy control circuit according to the invention and of the supervisory equipment associated therewith at the switchboard operator's positions and also at the chief operator's position.

In order to present a unified system, Fig. 2 should be placed to the left and Fig. 4 to the right of Fig. 3.

BRIEF DESCRIPTION OF APPARATUS

Figure 1:
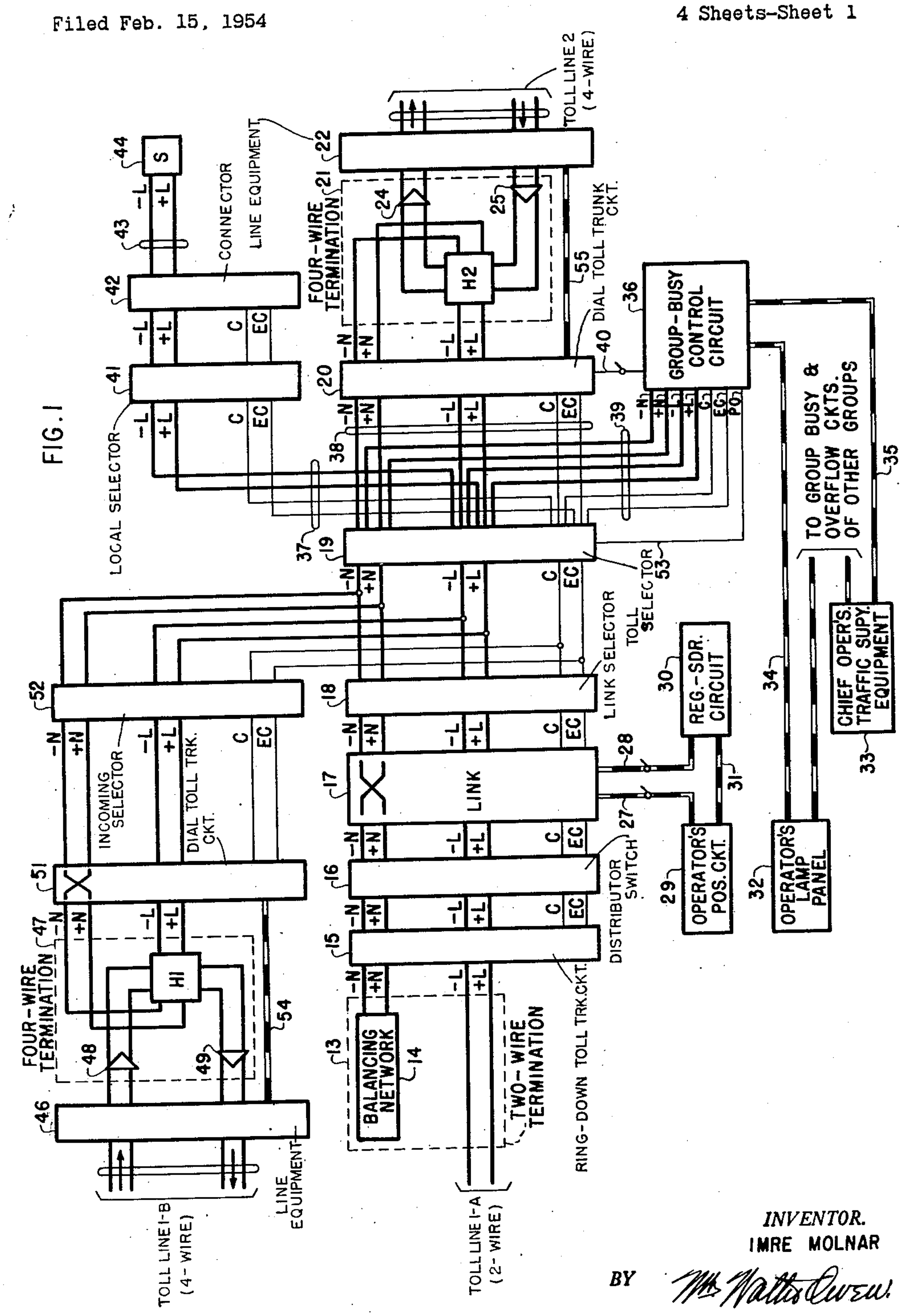
Fig. 1 is the schematic trunking diagram of part of a central office including, among others, a dial toll board and a rank of camp-on-busy type toll selectors according to the invention.

A brief explanation will first be given of the apparatus involved in the embodiment of the invention described herein. Referring particularly to Fig. 1 there has been schematically illustrated a toll office which is assumed to be centrally located with respect to a larger network of toll offices not shown and to function as a tandem office on calls between another originating office and another terminating office. The central office, Fig. 1, has a dial toll board which in many respects is similar to the tool board disclosed in the co-pending application, Serial No. 181,508 filed by Harvey W. Balzer on August 25, 1950. This dial toll board has a number of operator's position circuits 29 and sender circuits 30 interconnected by a cable 31 and connected to the link circuits such as 17 of a given operator's position by cables 27 and 28 respectively. In practice the individual senders are connected to the link circuits and operator's position circuits by way of access switches but these access switches have been omitted as unessential from the drawings. On the other hand, in order to facilitate the understanding of the invention certain portions of link, sender and operator's position circuits, have been separately illustrated in some detail in Fig. 2.

In Fig. 1 it has been assumed that the rear ends of the links 17 are accessible to various trunk circuits, such as the ring-down trunk circuit 15 which is associated with 2-wire toll line 1A incoming from another toll office not shown, viz. by way of distributor switches such as 16 of the forward hunting type. Each of these distributor switches which is individually associated with a given trunk circuit, corresponds in a general way to the link finders shown in the above-mentioned Balzer application. The exact manner in which incoming trunk calls are distributed to the individual operator's positions and the individual links at these positions is of no significance in connection with the present invention.

The front end of each link such as 17 has individually associated therewith a link selector 18 and these link selectors, in turn, have access to a rank of camp-on-busy type toll selectors such as toll selector 19 which is shown in greater detail in Fig. 3. Both selector switches 18 and 19 are assumed to be of the well-known Strowger type. As regards circuit design selectors 18 and 19 also may generally be of the same type except that the link selectors 18 need not be equipped with the camping facilities provided in the selectors 19 in accordance with the present invention.

More specifically, both selectors 18 and 19 are arranged for high-low duplex signalling over the extra control or EC conductor, i. e. both the numerical impulses from the operator's sender and the various supervisory signals originating at the various stages of the switch train are transmitted, in a forward and rearward direction respectively over the last-mentioned conductor, use being made of marginal relays. The EC conductor is provided in addition to the regular control or C conductor which serves for testing and holding purposes in the conventional manner. As to the aforementioned EC duplex signalling feature the dial toll board and its associated equipment as shown in Fig. 1 is quite similar to the automatic toll board and associated apparatus disclosed in the aforementioned United States patent application of H. W. Balzer, particular reference being made at this point to the circuit of toll preselector 1400 as illustrated in Fig. 14 of the Balzer application. However, in addition to the above-mentioned C and EC conductors and the covnentional pair, —L, +L, of talking conductors, selectors 18 and 19 of the instant application have a further pair of voice current carrying conductors, designated —N and +N in Fig. 1, together with an associated additional pair, —N, +N, of voice current carrying wipers and contact banks as shown in greater detail in Fig. 3 for selector 19. This additional pair of conductors, wipers and banks is required because the central office shown in Fig. 1 employs what is known as 4-wire network type switching. This switching method which is useful in connection with the switching of 4-wire voice repeated toll trunks will be more fully explained hereinbelow.

As will be seen from Figs. 1 and 3 the camp-on-busy selectors such as 19 have access over groups of local trunks such as trunk 37, to a local switch train comprising local selectors such as 41 and connectors such as 42, whereby access may be obtained to subscriber's lines connected to the central office, Fig. 1, for example, line 43 of substation 44. In Fig. 3 it has been assumed that local trunk 37 is connected to the first set of bank contacts in any of levels 1–4, 6 or 8 of selector 19. The automatic switching equipment over which the individual subscriber in this office may be connected with each other without the aid of an operator has not been shown in Fig. 1, as this equipment is not essential for an understanding of the invention; nor does Fig. 1 show the equipment over which these local subscribers may reach the dial toll board on outward calls. CLR trunks circuits, accessible to local selectors and each having a distributor switch such as 15 associated therewith, may be used for this purpose in the well known manner, reference being made, for example, to CLR trunk circuit 600 of the above-named Balzer application.

As shown in Figs. 1 and 3, the camp-on-busy selectors 19 also have access to groups of toll trunks, it being assumed in Fig. 3 that four such toll trunk groups are connected to levels 5, 7, 9 and 10 respectively of these selectors. Each of selectors 19 is equipped with a set of normal post springs N. P. in the manner well known in the art and these normal post springs are arranged to be actuated when the switch shaft is raised to any level other than the last-mentioned four toll levels. Each of these four groups of toll trunks has a group-busy control circuit individually associated therewith, and one of these group-busy circuits is shown associated by way of conductor 40 with the corresponding group of dial toll trunk circuits including trunk circuit 20. This last-mentioned trunk circuit which is associated with toll line 2 outgoing to another distant toll office is assumed to be connected by way of trunk 38 to the first set of bank contacts in the seventh level of selectors 19 as indicated in Fig. 3. The contact banks of each of these camp-on-busy selectors such as 19 are equipped with an eleventh set of bank contacts in each level and each group-busy control circuit is connected to this eleventh set of bank contacts in the respective level of all the selectors of this rank, group-busy circuit 36, Figs. 1 and 4, for example, being connected by way of cable 39 to the eleventh set of six bank contacts in the seventh level of these selectors. When the wipers of one of these selectors are advanced to this eleventh rotary or overflow position as more fully described below, the cam springs, Fig. 3, of this selector also are actuated in a manner well known in the art.

Each of the camp-on-busy selectors such as 19 also is equipped with a vertical wiper 92 and associated bank, Fig. 3, and as indicated in this figure, each of the four group-busy control circuits is additionally connected by a conductor designated PO with the corresponding vertical bank contact of all selectors of this rank, the PO conductor associated with group-busy circuit 36 bearing the reference numeral 53. Referring to Figs. 1 and 4 it will also be noted that each of the group-busy control circuits is connected over a cable such as 34 with an associated set of supervisory lamps in the lamp panel such as 32 of all operator's positions of the switchboard and connected by way of a cable such as 35 with another set of lamps and a multi-level manual selecting switch MS in the chief operator's traffic supervisory equipment 33.

It will be appreciated from the foregoing description that calls originating in a remote toll office and incoming to the tandem office, Fig. 1, over toll line 1A may be extended by one of the operators at the dial toll board by way of link selector 18 and camp-on-busy selector 19 to a terminating toll office reached over toll line 2. However, inasmuch as the rank of camp-on-busy selectors such as 19 is also accessible over the banks of incoming intertoll selectors such as 52 shown in the upper portion of Fig. 1, the same camp-on-busy selectors may also be used for the automatic establishment by an operator in a remote originating office, of through connections extending by way of the tandem office, Fig. 1, to a terminating toll office such as the one connected to the distant end of toll line 2. As will be seen from Fig. 1, incoming selector 52 is individually associated with dial toll trunk circuit 51 which, in turn, is associated with 4-wire toll line 1B incoming from a remote toll office. Toll lines 1A and 1B may be incoming from the same or different originating toll offices. It should further be understood that the intertoll switch train and also the other trains of conversational switches shown in Fig. 1, may in addition to the camp-on-busy selectors 19 include switching stages other than those illustrated in Fig. 1.

It will be noted from Fig. 1 that while toll line 1A is assumed to be of the 2-wire type employing no voice frequency repeaters, both toll lines 1B and 2 are of the 4-wire terminal repeatered type. In accordance with these two different types of lines ring-down toll trunk circuit 15, which is associated with 2-wire line 1A uses a two-wire termination 13 which consists of a balancing network 14 connected to the network pair incoming to trunk circuit 15. In contradistinction each of dial toll trunk circuits 51 and 20 has a 4-wire termination, 47 and 21, associated therewith which includes a hybrid coil, H1 and H2, a West-East amplifier, 48 and 24, and an East-West amplifier, 49 and 25, respectively.

Both dial toll trunk circuit 51 at the incoming end of 4-wire toll line 1B and dial toll trunk circuit 20 at the outgoing end of 4-wire toll line 2 furthermore have line equipment, 46 and 22 respectively, associated therewith, the type of this equipment depending on the kind of 4-wire circuit used. Thus, if the toll line in question consists of two physical conductor pairs, one for each direction of speech transmission, and employing simplex or composite dialling and signalling then the associated line equipment will include a simplex or composite set, for example of the general types shown in Molnar Patent 2,333,485 or 2,381,769 with the necessary repeat coils and condensers for this purpose; or, if the toll line, for example, is of the radio or carrier type, with separate high frequency channels used for the two opposite directions of speech transmission, then the associated line equipment will contain the required filters and related apparatus. Reference is made to United States Patent 2,559,165 to Molnar for an illustration of the manner in which the various control and supervisory signals, including the dial pulses, may be transmitted over such a carrier terminal. Cables 54 and 55, Fig. 1, respectively interconnect the line equipment and associated trunk circuit for the transmission of the necessary control and supervisory signals therebetween.

From the foregoing description it will be apparent that if line equipments 22 and 46 are of the same general type, the line and terminating apparatus shown in Fig. 1 as associated with the outgoing end of toll line 2 may also be associated with the outgoing end of toll line 1B in a remote originating office, and this last-mentioned toll office may, in fact, be of the same design as the toll office shown in Fig. 1. Conversely, the line and terminating apparatus shown in Fig. 1 as associated with the incoming end of toll line 1B may also be associated with the incoming end of toll line 2 in a distant terminating office. Furthermore, it will be understood that while no outgoing connections to dial toll trunk circuit 51 and no incoming connections from dial toll trunk circuit 20 have been shown, both these trunk circuits and their associated line equipment may well be of the two-way type and, therefore, respectively of identical design.

It will be noted from Fig. 1 that when a connection has been established, via the 4-wire intertoll switch train in the tandem office, Fig. 1, from toll line 1B to toll line 2 the line terminals of hybrid coil H1 in termination 47 are connected by way of the line or talking conductors —L, +L of the intertoll train to the line terminals of hybrid coil H2 in termination 21; and that the network terminals of these two hybrid coils instead of being connected to an associated balancing network as they would be in accordance with usual practice are interconnected by way of the network conductors —N, +N of this intertoll train. As a result, audio frequency energy from the outputs of amplifier 48 is transmitted, from hybrid coil H1 over the talking pair and the network pair of the intertoll train in parallel to hybrid coil H2 and hence to the input of amplifier 24; and the transmission of speech energy in the opposite direction, viz. from the output of amplifier 25 to the input of amplifier 49, also takes place over the talking and network pairs of the intertoll train in parallel. It will readily be seen that due to the absence of balancing networks the stability of such voice repeatered tandem toll connections is improved. Furthermore, a greater overall gain is obtained as the transmission losses inherent in the use of the balancing networks are eliminated. Proper phasing is maintained by the introduction of a conductor reversal in the network pair as indicated in dial toll trunk circuit 51. For further details of this network type 4-wire switching system reference is made, for example, to British Patent 499,832.

When a non-repeatered toll line such as 1A is to be interconnected over the switching facilities of the tandem office, with a voice repeatered 4-wire line such as 2, the pair of network conductors is used in a different way. As will be seen from Fig. 1, the line terminals —L, +L of the hybrid coil H2, of the 4-wire line are, in this case connected over the regular talking pair of the switch train to the talking conductors of the two-wire toll line; and the network terminals —N, +N of this hybrid coil H2 are connected, back over the network conductors of the whole switch train, to balancing network 14 which is directly associated with toll line 1A. In this manner the balancing network can be dimensioned to precisely duplicate the impedance of its associated toll line 1A, thereby to minimize the danger of singing due to output voltages from amplifier 25 reaching the input of amplifier 24.

The trunk circuits are designed to normally maintain a guarding termination, not shown, on their "outer" network terminals, thereby terminating the network terminals of the associated hybrid coil in the absence of or prior to the completion of a terminating circuit extending over the network conductors of the entire switch train. D. C. signalling circuits extending over the —N and +N conductors of the switch train interconnecting the two terminations are provided for the purpose of removing this guarding termination when no longer required, i. e. when the network pair has been properly terminated at its other end upon switch through. The details of this signalling arrangement which also requires a reversal of the network conductors such as in trunk circuit 51 or link 17 have not been shown herein but reference is made in this connection to the above-mentioned British Patent No. 499,832. On calls from a 4-wire line such as 1B to a standard 2-wire circuit, e. g. to subscriber line 43 by way of 2-wire local switches 41 and 42 the guarding termination, in the assumed case in trunk circuit 51, must of course, be left in circuit for the duration of the call. Talking connections to or from an operator at the dial toll bord also are established on a 2-wire basis. Thus referring to both Figs. 1 and 2, when incident to the extension by the toll operator of a call from toll line 1A to toll line 2, relay 210 in link circuit 17 is operated to switch the front end of this link circuit from the rear end of the link to the operator over telephone circuit 202, the network pair is opened in the link at contacts 211, 212 of relay 210 and the resulting interruption of the above D. C. signalling circuits extending over these network conductors causes the aforementioned guarding termination automatically to be reintroduced in dial toll trunk circuit 20. The D. C. signalling circuits referred to above also control in a manner shown in British Patent 499,832, the automatic insertion or removal of attenuation pads as required by the type of termination at the other end of the switch train. The inclusion of such pads is necessary, for example, in case of the interconnection of two 4-wire lines, such as 1B and 2, as otherwise the overall gain would be excessively high due to the absence of balancing network losses in this type of connection. In order to keep the regular talking conductors terminated at all times other guarding terminations are provided in the individual switches of the switch train and these line terminations are successively made effective in the usual manner as the setting up of the connection progresses.

DETAILED CIRCUIT DESCRIPTION

A. *Operator in tandem office extends call from toll line 1A to local subscriber S*

The extension by an operator at the dial toll board, Fig. 1, of a call from toll line 1A to local subscriber S will now be described in detail. Referring more particularly to Fig. 2, when an idle link such as 17 at a suitable operator's position is seized by distributor switch 16 responsive to the receipt by trunk circuit 15 of such a call over the associated toll line 1A, relays 210 and 240 in the link circuit operate over circuits not shown. Relay 210 upon operating, at its contacts 214 and 216 prepares the connection of the operator's telephone circuit 202 over conductors 206, 207 to the talking conductors of link selector 18 and is, therefore, similar in function to talk relay R1340 in Fig. 13 of the above-mentioned Balzer application. Relay 240 upon operation, at contact 241 grounds the C conductor outgoing to link selector 18 to seize this switch; at contacts 244, 245 extends the talking conductors of the link selector by way of contacts 231, 233 and conductors 209, 208 to a line termination 290, 204 in the sender circuit; and at 242, 243 transfers the EC conductor of the link selector from front supervisory relay 220 corresponding substantially to relay R1370 of the Balzer application to sender supervisory relay 280 over a circuit including conductor 200 and sender impulse contact 205 or contact 271 of relay 270.

The selector switches in the tandem office, including selectors 18 and 19, are of the battery searching type and are arranged for forward holding over the C conductor. Thus, when ground is applied to the front C conductor at contact 241, a circuit is closed through the winding of a relay in link selector 18, corresponding to the lower winding of relay 330, Fig. 3, to battery; and at the same time the following circuit including sender supervisory relay 280, Fig. 2 is closed by way of the EC conductor for the impulse relay of this selector, corresponding to relay 310, Fig. 3: battery, winding of relay 280, contact 205 or 271, conductor 200, contact 243, EC conductor of link selector 18, and thence through a contact similar to 349*e*, Fig. 3, and the active winding of an impulse relay similar to relay 310 to ground. As the windings of both relay 280 and the selector impulse relay are of low resistance, both relays operate in this circuit. This impulse relay in selector 18 upon operating causes the operation of a hold relay similar to relay 320, whereby the seizure of link selector 18 is completed.

The operator may now set up the digits corresponding to the designation of the call on her key set not shown for registration in an associated digit register, also not shown, and this causes the key sender, Fig. 2, to transmit the corresponding series of impulses by means of impulse contact 205 in a manner similar to that disclosed in the above-listed Balzer application. As in the case of the Balzer application it is assumed that impulse contact 205 is actuated, i. e. intermittently opened and closed, by some kind of prime mover which is maintained in operating condition substantially throughout the holding time of the sender, and that this impulse contact is rendered effective only at such times as relay 270 is operated, thereby opening the short circuit across impulse contact 205 at contact 271. In this manner, both the number of impulses in each series and the length of the various interdigital intervals may readily be controlled. In substance, therefore, impulse contact 205 takes the place of contact 2088 in Fig. 20 of the Balzer application, while contact 271 of relay 270 is assumed to combine the functions of all shorting contacts such as 2025, Fig. 20, and 1955 of that application.

Responsive to the transmission by sender circuit 30 of the first series of impulses the above mentioned impulse relay is restored a number of times corresponding to the number of impulses in the series and the wipers of link selector 18 are accordingly raised to the corresponding group. At the end of the impulse series the wipers of link selector 18 are automatically rotated over the bank contacts of this level in the well known manner until a trunk leading to an idle toll selector is found. Assuming that toll selector 19 is the first idle selector encountered in the selected level, two seizure circuits are closed for selector 19, one including the lower winding of changeover relay 330 and the other including the upper winding of impulse relay 310. The first of these circuits may be traced from ground at contact 241 over the C conductor and wiper not shown of selector 18, conductor 295, vertical off-normal contact 84, lower winding of relay 330 to battery. The second-mentioned circuit, on the other hand, extends from battery through the low resistance winding of relay 280, impulse contact 205 or shorting contact 271, conductor 200, contact 243, EC conductor and wiper not shown of link selector 18, conductor 296, contact 349*e*, upper low resistance winding of relay 310 to ground.

All three relays 280, 310 and 330 operate over these circuits. Relay 310 at contact 312 causes the operation of hold relay 320 over its upper winding from ground at contact 348, and this last-mentioned relay in operating completes a holding circuit for itself which may be traced from ground on hold conductor 295 through contacts 349*c* and 323 to the lower winding of relay 320 and battery.

Sender circuit 30 now transmits, by means of impulse contact 205, the second series of impulses which may be 6 if local trunk 37 is assumed to be connected to the 6th level of selector 19. Relay 270 is operated during the transmission of the impulse series to remove at 271 the short circuit across impulse contact 205. Upon each opening of impulse contact 205 both relays 280 and 310 restore, the intermittent restoration of relay 280 being of no consequence at this time. When relay 310 releases for the first time the following holding circuit is established for changeover relay 330: ground, contacts 348, 311, 337 and 322, upper winding of relay 330, battery. Vertical magnet 380 is energized in parallel with the last mentioned winding and the actuation of this magnet causes the switch wipers to be raised one step; vertical off-normal contacts 82, 83 and 84 also are actuated at this time in the well known manner. At contact 84 the circuit to the lower winding of relay 330 is opened but due to the slow release action of this relay the relay is held operated by way of its upper winding throughout the impulse series. At contact 82 the following circuit is closed for interrupter relay 350: ground, contacts 326, 349*b*, 82, 391, winding of relay 350, battery. Relay 350 operates in this circuit without effect at this time. At contact 312 of relay 310 the above-traced circuit extending through the upper winding of hold relay 320 is opened but this relay remains operated over its aforementioned holding circuit. Upon the first reoperation of impulse relay 310 the above circuits extending in parallel through the upper winding of relay 330 and the winding of magnet 380 are opened so that magnet 380 restores.

Since the second digit is assumed to be 6, relay 270, Fig. 2, will restore after the transmission of the sixth impulse so that relays 280 and 310 reoperate and remain reoperated for the time being. Relay 330 accordingly releases. Relay 330 in restoring at contact 335 short circuits line termination 73, 74; at 337 opens another point in its own holding circuit and at 338 completes the following circuit for rotary magnet 390: ground, contacts 324, 338, 351, magnet 390, battery. Magnet 390 in operating advances the switch wipers to the first set of bank contacts in the sixth level and at its interrupter contact 391 causes the release of relay 350 which at contact 351 in turn opens the circuit of magnet 390 so that this magnet restores.

Upon the first rotary step of selector switch 19 rotary off-normal contact 77 is actuated without effect at the present moment. Also upon the first rotary step the wipers of the selector switch engage the first set of bank contacts in the selected level to which local trunk 37 is shown connected in Fig. 3 so that this trunk is now tested for its idle condition by way of test wiper 90. Assuming that local selector 41 reached over this trunk is idle, switching relay 340 of selector 19 is operated in a circuit extending from ground at contact 325 over the upper winding of relay 340, cam contact 79, contact 363, wiper 90 in rotary position 1 and the C conductor of trunk 37 to a relay similar to relay 330, in selector 41 and battery.

Both the last mentioned relay and relay 340 operate in this circuit. Relay 340 upon operating at its preliminary or X contact 349*a* closes a locking circuit for itself extending from ground at contact 326 through contact 349*a* and the lower winding of relay 340 to battery; at contact 349*b* causes the release of relay 350 so that rotary magnet 390 is kept from reoperating; at contact 349*d* connects the lower winding of relay 340 to ground on conductor 295 independently of ground from contact 326; at 349*c* opens the holding circuit of relay 320; at contact 349*e* disconnects the upper winding of impulse relay 310 from EC conductor 296; at 349*f* switches the last-mentioned conductor through to the EC conductor of local trunk 37, namely over cam contact 81, contact 366 and EC wiper 91; at 348 opens a point in the circuit of the upper winding of relay 320; at 349 connects direct ground to C wiper 90 independently of ground from contact 325; at contacts 344, 346 switches the regular talking conductors 293, 294 through to the talking conductors of local trunk 37, namely by way of contacts 344, 335 and wiper 88, and contact 346 and wiper 89 respectively. Line termination 70, 71 is disconnected at contacts 343. Impulse relay 310 and hold relay 320 both restore when the circuits of their active windings are opened by relay 340 as described.

It will be noted that as local trunk 37 contains no network conductors, the pair of network conductors 291, 292 remains open in spite of the closure of contacts 341 and 342 of relay 340, but conductors 293, 294 and 296 are now switched through to the respective conductors incoming to local selector 41, the last-mentioned selector being seized in a manner substantially similar to that described for toll selector 19.

Relay 270, Fig. 2, reoperates at the end of the interdigital interval to remove the short circuit from impulse contact 205 for the effective transmission of the impulses of the third digit in accordance with which local selector 41 is raised to the desired level in a manner similar to that described for selector 19, whereupon selector 41 automatically hunts for a trunk to an idle connector such as connector 42. The following two impulse series are used in a manner analogous to that described in Balzer application, Serial No. 181,508 for setting the connector switch on the subscriber's line, such as line 43 associated with substation 44 of called subscriber S. Assuming that this called subscriber's line is idle the bell not shown at this substation is rung, for instance automatically from connector 42, and sender circuit 30 is released, all as described in the last-mentioned Balzer application. Upon the release of the sender relay 240, Fig. 2, restores and switch-through relay 230 operates, this last-mentioned relay being similar to relay R1330 of the Balzer application except that relay 230 is arranged to be operated upon release of the sender while relay R1330 of the co-pending application restores upon sender release, viz. to effect a switch-through operation in the link circuit.

Relay 230 in operating at contacts 235 maintains holding ground on the C conductor independently of contact 241, and at 236 prepares the connection of front supervisory relay 220 to the EC conductor. At contacts 231, 232 and 233, 234 the front line conductors of link 17 are transferred from sender conductors 208 and 209 to the operator's telephone circuit 202, namely by way of contacts 214, 216 and conductors 206, 207. Upon release of relay 240 multiple ground is removed from the C conductor at contact 241; further points in the line conductors to the sender are opened at 244, 245; and at 243, 242 the EC conductor leading to the switch train is transferred from sender supervisory relay 280 to front supervisory relay 220 of the link. In the connector low resistance ground is normally connected to the EC conductor so that supervisory relay 220 which is of the marginal type operates, thereby closing at 221 an obvious circuit for front supervisory lamp 201. When the called subscriber answers this low resistance ground is replaced in the connector by high resistance ground in the manner described in the co-pending Balzer application and as a result supervisory relay 220 releases, thereby extinguishing front supervisory lamp 201 to give the operator answering supervision. The operator may now converse with the called subscriber by means of her telephone circuit 202 which is switched through to the called subscriber's line by way of the talking pair of the switch train; and upon ascertaining that the called subscriber is ready to receive the call she may operate her position disconnect key not shown to cause the release of talk relay 210. After the restoration of the last-mentioned relay the rear portion of link 17 which is connected to toll line 1A is switched through at contacts 213, 215 to the called subscriber by way of the switch train and the operator's telephone circuit is disconnected at contacts 214, 216.

The two subscriber's involved in the connection may now converse with each other and at the end of the conversation disconnect supervision is obtained from the called end by substitution in the connector of low resistance ground for high resistance ground thereby causing the reoperation of relay 220 and the lighting of front supervisory lamp 201. When the operator thereupon actuates her release key not shown, relay 230 is caused to restore in a manner not particularly illustrated, and this relay upon restoring causes the release of the entire switch train by removing ground from the C conductor at contact 235. The disconnection of ground from C conductor 295 due to the resultant release of the switch-through relay not shown in link selector 18 permits switch-through relay 340 of camp-on-busy selector 19 to release, and this relay upon restoring closes the following circuit for release magnet 300: ground, contacts 348, 311, 336, 321, 83, winding of magnet 300, battery. Release magnet 300 upon operating causes the release of the selector switch in the well known manner. When the switch mechanism has reached its normal position the vertical off-normal springs also are restored to normal, whereby the circuit of release magnet 300 is opened at 83. The other switches of the train are released in a similar manner.

In the foregoing description it was assumed that local trunk 37 which is connected to the first set of contacts in the sixth level of selector 19 is found idle by the switch. If this trunk happens to be busy battery is not encountered by C wiper 90 in the first rotary position and as a consequence the interaction between interrupter relay 350 and rotary magnet 390 continues and the switch is further advanced until relay 340 operates upon an idle trunk being found.

If all trunks in the level are busy, the automatic advancement of the switch over the bank contacts of level 6 continues until the switch reaches its eleventh rotary position in which cam contacts 78 to 81 are actuated. Attention is called to the wiring of the —L, +L, C and EC bank contacts in this position of level 6.

When cam contacts 80 close the following operating circuit is completed for the upper winding of relay 340 and the lower winding of relay 330 in series: ground, contact 325, upper winding of relay 340, cam contact 80, lower winding of relay 330, battery; both relays operate in this circuit. Relay 340 at contact 349*a* and 349*d* again locks over its lower winding; at 349*b* opens the circuit of interrupter relay 350; at 349 closes direct ground to the lower winding of relay 330 by way of contact 80; at contacts 349*e* and 348 opens the operating circuits of relays 310 and 320 respectively and at 349*c* opens the locking circuit of the last-mentioned relay so that relays 310 and 320 again are permitted to release; and at contacts 343, 344 and 345, 346 transfers the incoming line conductors from line termination 70, 71 to line termination 73, 74 namely by way of conductor 293, contact 344, resistance 73, condenser 74, line wiper 88 in the eleventh position of level 6, strap 62, line wiper 89 in the eleventh position of this level, contact 346 and conductor 294. It should be noted that due to the operation of relay 330 the short circuit across termination 73, 74 is opened at conductor 335 and that due to the actuation of the normal post springs on level 6 which is a non-toll level, the further short circuit across condenser 74 is opened at normal post contact 75.

Due to the opening of cam contact 81 the following circuit is now intermittently established at contact 349*f* of relay 340 for the intermittent operation of sender supervisory relay 280: ground, common 120 or 60 I. P. M. interrupter 64, conductor 69, EC wiper 91 in rotary position 11, contact 366, low resistance non-inductive winding of relay 310, contact 349*f*, conductor 296, EC wiper not shown and conductor of link selector 18, Fig. 2, contact 243, conductor 200, shorting contact 271, winding of relay 280, battery. Due to the intermittent closing and opening of the last-traced circuit at flash-busy interrupter 64, sender supervisory relay 280 is now alternately operated and released and these intermittent operations of supervisory relay 280 bring about the forcible release of sender circuit 30 in a manner not particularly shown in Fig. 2. Reference again is made to the above-mentioned co-pending Balzer application wherein the sender is caused to release when relay R1910 which corresponds to relay 280 of the present application, restores upon the first opening of the supervisory circuit following the second ground pulse received from the flash busy source. The release of the sender again results in the restoration of relay 240 and the operation of relay 230 in link 17, Fig. 2, as a consequence of which the EC conductor 296 is switched from sender supervisory relay 280 to the front supervisory relay 220 of this link. Relay 220 accordingly is intermittently operated in response to further ground pulses received from flash busy interrupter 64 and front supervisory lamp 201 accordingly caused to flash at the same rate, advising the operator of the all-trunks-busy condition.

In the embodiment described herein it has been assumed that the flashing of the supervisory lamp at a 120 I. P. M. rate signifies a reorder signal, that a flashing of this lamp at a 60 I. P. M. rate denotes a master busy signal; and that an irregular flashing of the lamp at the rate of 30 I. P. M. gives the operator a camping signal. As indicated in Fig. 3 either the 120 I. P. M. reorder rate or the 60 I. P. M. master busy rate may be used as desired to notify the operator of an all-trunks-busy condition in a local trunk group. Receipt of one of these flash-busy signals will induce the operator to again attempt the completion of the local call immediately after, or a reasonable time after release of the original connection.

Upon receiving the flash busy signal the operator releases the connection by actuating her release key not shown, thereby bringing about the restoration of relay 230. When ground is disconnected from C conductor 295 following the opening of contact 235 the circuit of the lower winding of relay 340 is opened as above described. This relay accordingly restores to normal, thereby at 349 opening the circuit of the lower winding of relay 330 and at 347 completing the following circuit for overflow meter 61 associated with the local trunk group, level 6: ground, contacts 348, 311, 337, 78, 347, 76, C wiper 90 in the eleventh rotary position, winding of overflow meter 61, battery. This circuit is opened at contact 337 as soon as slow-to-release relay 330 has returned to normal. Also upon the restoration of relay 330 the above-traced circuit of release magnet 300 is closed at contact 336 and the selector switch accordingly returned to normal as described above. The release of link selector 18 takes place substantially as above described.

B. *Operator in tandem office extends call from toll line 1A to toll line 2*

It will now be assumed that the operator at the dial toll board Fig. 1 wishes to extend a call incoming over toll line 1A to toll line 2 which as mentioned above is reached over the seventh level of camp-on-busy selector 19, the particular dial toll trunk circuit 20 associated with toll line 2 being connected to the first set of contacts in this level. The operation of selector 19 when raised to level 7 is substantially similar to that described above for a call over level 6 of this selector except that since level 7 is a toll level normal post contacts 75 and 76 are not actuated on this level. It will further be noted from an insepction of Fig. 3 that PO conductor 53 is connected to the seventh contact in the vertical bank of this rank of selectors, the other end of this conductor being connected to the group busy control circuit, Fig. 4, associated with the toll trunk group, level 7. However, since ordinarily no potential is connected to conductor 53 in the group busy circuit, relay 360 which by way of contact 371 is connected to vertical wiper 92 is unable to operate.

Assuming that dial toll trunk circuit 20 is idle, switch through relay 340 of selector 19 operates over C wiper 90 in rotary position 1 in a circuit extending to battery, not shown in trunk circuit 20. The functions of switch through relay 340 upon operating are the same as described above for a local call except that in the instant case network conductors 291 and 292 are extended at contacts 341 and 342, viz. by way of contacts 331 and 333 and network wipers 86 and 87 respectively, to the network conductors —N and +N leading to dial toll trunk circuit 20.

The detailed manner in which the call is further extended over toll line 2 is of no relevance to the present invention, but for purposes of illustration it may be assumed that toll line 2 leads to a terminating exchange substantially the same as the tandem office shown in Fig. 1; the various terminating apparatus associated at the far end of this toll line therefore correpond to the terminal apparatus shown associated with the incoming end of toll line 1B in Fig. 1. With respect to the transmission of the dial pulse over toll line 2 reference is made to the inter-toll trunk 400 shown in Figs. 4 and 5 of the above-mentioned Balzer application, these figures containing disclosure with respect to the conversion of signals received over a local EC conductor into simplex signals to be transmitted over a pair of toll line conductors and vice versa. In this manner the call may be extended under the control of sender circuit 30 to a called subscriber similar to subscriber S, Fig. 1, namely over a train of switches corresponding to incoming selector 52, toll selector 19, local selector 41 and connector 42, Fig. 1, in the terminating office.

When the called subscriber answers the call, the answering signal originating in the connector is transmitted over the EC conductor of the switch train of the terminating office to the trunk circuit associated with toll line 2 in that office; is then converted in said trunk circuit into a simplex signal transmitted back over toll line 2; and is finally re-converted in dial toll trunk circuit 20, Fig. 1, into the corresponding EC signal which causes the release of front supervisory relay 220, Fig. 2, as described above for a local call, thereby giving the operator answering supervision. When the operator thereupon switches the connection through from the calling to the called subscriber the voice currents incident to the conversation of these two subscribers are transmitted in both directions over the talking pair of the switch train in the tandem office, Fig. 1, but over toll line 2 these voice currents are transmitted on a four-wire basis, that is, the west-east transmission is effected over the upper and east-west transmission over the lower pair of this toll line as viewed in Fig. 1. The feeding back of voice frequency voltages from the output of amplifier 25 into the input of amplifier 24 is minimized due to the fact that precision balancing network 14 is connected over the network pair of the tandem switch train to the network terminals of hybrid coil H2. The release of the connection takes place substantially as described for a local call after "on-hook" supervision has been received by the dial toll board operator from the terminating end of the connection.

In the following part of this description various conditions will now be discussed under which selector 19 after having been selectively set on its seventh level is automatically advanced into the eleventh rotary or overflow position in this level. For a discussion of these conditions it may be helpful to list the significance of the various positions on which manual selecting switch MS in the chief operator's traffic supervisory equipment 33 may be set, in the form of a table, namely as follows:

MANUAL SELECTING SWITCH MS

| Position | Function |
|---|---|
| 1 | reorder. |
| 2 | no camping. |
| 3 | 1 selector camping. |
| 4 | 2 selectors camping. |
| 5 | 4 selectors camping. |
| 6 | test. |
| 7 | 30 minutes to 1 hour delay. |
| 8 | 1 hour to 3 hours delay. |
| 9 | 3 hours to 6 hours delay. |
| 10 | over 6 hours delay. |
| 11 | indefinite delay. |

Attention is called, particularly, to the "limited camping" positions 3–5 which are suitable for use during periods of moderately heavy traffic such as the normal busy hour; and also to "posted delay" positions 7–11 which are used under conditions of extreme traffic congestion.

Let it first be assumed that the manual selecting switch

MS, Fig. 4, which is associated with the group of toll trunks connected to level 7 of the camp-on-busy selectors, has been set on position 3 to permit one selector to camp on this group when busy, and let it further be assumed that an all-trunks-busy condition actually exists in this group at a given moment so that the busy indicating contacts such as 451 and 461, Fig. 4, of all toll trunk circuits in this group are operated and ATB relay 420 accordingly released. At contact 424, therefore, an obvious circuit is closed to group busy lamp 482 at the chief operator's position advising this operator of the all-trunks-busy condition in the toll trunk group in question, and at contact 425 another circuit is closed to a similar group busy lamp 472 at each of the switchboard operator's positions, whereby these operators also are notified of this condition. It will be understood, of course, that a set of lamps as shown in Fig. 4 at the switchboard operator's and the chief operator's positions for the one toll group, level 7, is provided at these various operator's positions for each group of toll trunks outgoing from the tandem office.

At its contacts 426 and 428 ATB relay 420 upon releasing prepares circuits extending over EC conductor 98 and PO conductor 53 respectively and at contacts 421—423 conditions polarized relay 410 for limiting to one the number of toll selectors simultaneously permitted to camp on this busy group. It will be noted that with selecting switch MS in position 3 polarized relay 410 is connected into the diagonal of a Wheatstone bridge having the following four arms: battery-connected 1,000 ohm resistance 474; 1,000 ohm resistance 476 which is ground-connected by way of contact 423 and wiper 485 of switch MS in position 3; battery-connected 1,000 ohm resistance 473; and the 1,000 ohm total resistance resulting from the series connection of 750 ohm resistance 475 and 250 ohm resistance 478 in a circuit extending from ground by way of resistance 475, contact 421, resistance 478 and wiper 484 of switch MS in position 3 to the right-hand terminal of relay 410. All four arms of the Wheatstone bridge are, therefore, of equal resistance namely 1,000 ohms, and hence the bridge is at balance and polarized relay 410 which is spring-biased towards its normal position does not operate under this condition. However, since conductor 93 is connected to the last-mentioned terminal by way of contact 422 of all-trunks-busy relay 420 the circuit is set for a change in the condition of balance of the Wheatstone bridge by the application, over a —N wiper such as 86, of camping potentials to this conductor, in a manner more fully explained hereinbelow.

Assuming now that one of the toll selectors of the rank in question, for instance, toll selector 19, Fig. 3, is set by an operator at the dial toll board on level 7 under this condition, switching relay 340 will be unable to operate after the switch has taken its first rotary step as trunk circuit 20 is busy; moreover, as all the other trunks connected to this level also are busy as assumed, relay 340 cannot operate in any of rotary positions 2–10 either, and the selector will therefore, be automatically advanced into its eleventh or overflow position. Since the cam contacts are actuated in this position, relay 340 is now operated in series with relay 330 in the circuit traced above for the case of a busy local group and relays 310 and 320 are released as before. It will be noted from Fig. 3 that the various conductors of cable 39 leading to the group-busy control circuit Fig. 4, are connected to the overflow contacts of level 7 in all banks except the C bank. This last-mentioned bank is left unconnected on toll levels in the embodiment described herein, in particular no provisions are made for overflow metering for the reason that all-trunks-busy conditions are not treated as unstandard conditions on toll levels. In this connection it will also be noted that since normal post springs 76 are open on toll levels no metering potential can be connected, upon selector release, to C wiper 90 in the overflow position of these levels.

However, with contact 332 of relay 330 now closed and in view of the fact that rotary-off-normal contact 77 was actuated on the first rotary step of the selector switch, the following additional ground connection is established in the present instance to the right-hand terminal of polarized relay 410, Fig. 4: ground, contacts 77 and 361, 3,000 ohm resistance 72, contact 332, wiper 86 in position 11 of level 7, conductor 93, contact 422, right hand terminal of relay 410. With 3,000 ohm resistance 72 thus connected in parallel to the 1,000 ohms already connected in what may be termed the upper ground arm as seen in Fig. 4 of the Wheatstone bridge, the total resistance of this last mentioned arm is reduced from 1,000 to 750 ohms. Polarized relay 410 is designed to operate under this condition of unbalance. In this connection it will be noted that as indicated by the arrow in the bridge connection of relay 410 the current flowing through the windings of relay 410 as a result of this unbalance flows in the direction in which it aids the field due to the permanent magnet of this relay. A current flowing through relay 410 in the opposite direction, due to an unbalance of the bridge in the other sense, will not result in the operation of the relay. It will readily be seen, therefore, that relay 410 is arranged, generally speaking to operate when the number of camping selectors is greater than corresponds to the condition of balance of the Wheatstone bridge but not when this number is smaller than corresponds to this condition of balance. Moreover, once the relay has operated it will release when the bridge is returned to balance or becomes unbalanced in the opposite sense, such as by the release from their overflow position of one or both of the aforementioned selectors respectively. Relay 410 in operating closes its contact 411, thereby connecting ground to PO conductor 53 by way of contacts 428, 435 for the purpose of preventing further selectors set on level 7 from effectively camping on this group as more fully described hereinbelow. Closure of contact 411 also results in the lighting, over an obvious circuit, of the associated overflow lamp, 481, at the chief operator's position.

Reverting again to the engagement by the wipers of selector 19 of the eleventh set of bank contacts in its level 7, a regular flash busy signal is now transmitted at the rate of 30 I. P. M. to the dial toll board over the following circuit path: ground, common 30 I. P. M. interrupter 66, Fig. 4, conductor 480, wiper 488 of selecting switch MS in position 3, contact 426, conductor 98, EC wiper 91 in position 11, contact 366, lower non-inductive winding of relay 310, contact 349f, EC conductor 296, EC wiper not shown and conductor of link selector 18, contact 243 Fig. 2, conductor 200, contact 271, winding of sender supervisory relay 280, battery. As before the intermittent restoration and reoperation of relay 280 brings about the release of the sender and the release of relay 240 and operation of relay 230 of the link so that subsequent ground pulses originating in the interrupter 66, Fig. 4, are received by front supervisory relay 220 of link circuit 17, thereby causing front supervisory lamp 201 to flash at the corresponding rate. The 30 I. P. M. flash signal instructs the toll board operator to camp on the busy group, that is, the operator will hold the connection to the group busy control circuit, Fig. 4, in wait for the receipt of a further signal.

Subsequently, when a trunk in the group in question becomes idle, all-trunks-busy relay 420 will reoperate. At 424 and 425 relay 420 extinguishes the corresponding group busy lamps at the chief operator's and the individual switchboard operator's positions; at 428 ground is disconnected from PO conductor 53; at 421, 422 and 423 all ground conections to polarized relay 410 are opened and this relay thereby caused to release; and at 426, 427 the 120 I. P. M. flash busy source 65 is substituted for 30 I. P. M. flash busy source 66. Ground pulses are now connected to EC conductor 98 by way of conductor 479 and contact 427 and the flashing of link supervisory lamp 201 accordingly is changed to the 120 I. P. M. or reorder rate as an indication to the operator that a trunk in the desired group has become available. In response to this signal the operator will accordingly release the existing connection to the group busy control circuit and then reactuate her key set in another attempt to establish a connection to toll line 2 by way of the rank of toll selectors including selector 19.

Let is now be assumed that another selector of this rank is set on level 7 while the first selector is still camping in the overflow position of this level and while polarized relay 410 is still operated. When vertical wiper 92 of this second or "excess" selector engages the seventh vertical bank contact the following circuit is closed for the discriminating relay 360 of this selector: ground, contacts 411, 428, 435, PO conductor 53, seventh vertical bank contact and vertical wiper 92 of the second selector, contact 371, lower winding of relay 360, battery. Relay 360 upon operating at contact 364 locks to ground by way of contacts 324 and 338 as soon as changeover relay 330 releases; at contact 362 prepares another locking circuit for its upper winding; at contact 363 disconnects test wiper 90 from the upper winding of switching relay 340; and at contacts 366, 365 switches the non-inductive winding of relay 310 from EC wiper 91 to 60 I. P. M. or master busy conductor 85. Due to the interaction of relay 350 and rotary magnet 390 the selector switch now takes its first automatic rotary step as described hereinbefore and upon completion of the first step the above-mentioned further locking circuit for relay 360 is closed over the following path: ground, rotary off-normal contact 77, contact 362, upper winding of relay 360, battery, this path being independent of a contact of relay 320. Due to the fact that switching relay 340 is disconnected from test wiper 90 at contact 363 the last mentioned relay is kept from arresting the automatic rotary advancement of the selector switch in any of rotary positions 1 to 10 and the wipers of the selector switch are accordingly forced into the overflow position, where relays 330 and 340 operate and relays 310 and 320 release as above described.

As cam contact 81 also is actuated in this position 60 I. P. M. ground pulses are now connected to incoming EC conductor 296 by way of the following circuit: ground, 60 I. P. M. master busy interrupter 63, conductor 85, contact 365, non-inductive winding of relay 310, contact **349*f*, EC conductor 296. The resultant intermittent operation and release of relay 280 in sender circuit 30, Fig. 2, again brings about the release of the sender and the operation of relay 230 and release of relay 240 so that supervisory relay 220 of the link used by the switchboard operator in attempting the present call over the aforementioned further selector, is intermittently operated at the rate of 60 I. P. M. The corresponding flashing of supervisory lamp 201** serves to the operator as an indication that a master busy condition has been encountered in the setting up of the connection. The operators are instructed not to attempt any camping upon receipt of this master or final busy signal. The operator accordingly will release the connection by actuation of her release key and then try to complete the call at a later time, say after the lapse of 20 minutes.

Attention is called to the fact that relay 360 in the excess camp-on-busy selector is locked over a local circuit independently of contact 411 of polarized relay 410; that is, relay 360 remains operated even though the number of camping selectors later drops to or below the permitted limit, resulting in the release of relay 410, and even though the ATB condition later disappears which also results in the release of relay 410, viz. due to the opening of contacts 421—423. In this manner any inductment to the operator to camp on the busy group in spite of the receipt of the master busy signal is eliminated. It should also be noted that relay 360 at its contact 361 prevents the application of the 3,000 ohm camping ground to polarized relay 410 so that "excess' selector such as the one last referred to, that is selectors beyond the number permitted to camp, are not "counted" by relay 410 in determining this number.

Referring again to the various positions of manual selecting switch MS as listed in the above table it will be noted that by setting the switch on position 4 instead of 3 the chief operator may condition polarized relay 410 to limit to two the number of selectors permitted to camp on the toll group in question. As shown in Fig. 4, with switch MS in position 4, 1,500 ohms are normally connected during an ATB period into the upper ground arm of the Wheatstone bridge of this relay, viz. over a circuit extending from ground through 750 ohm resistance 475 contact 421, 250 ohm resistance 478, 500 ohm resistance 477, wiper 484 in position 4, to the right hand terminal of polarized relay 410. Relay 410 does not operate under this condition. When the total resistance in this branch of the bridge is later reduced to 1,000 ohms, namely by the parallel connection to the aforementioned 1,500 ohms of a 3,000 ohm resistance such as 72, Fig. 3, by way of wiper 86 of the first selector left camping in the overflow position of this group, the bridge is merely placed into a condition of balance and relay 410 is still unable to operate. However, when another 3,000 ohm resistance corresponding to resistance 72, Fig. 3, is additionally connected to conductor 93 incident to a second selector reaching the aforementioned overflow position the total resistance of the bridge arm in question is reduced to 750 ohms and relay 410 operates. Again closure of contact 411 causes overflow lamp 481 to be lit and ground to be connected to PO conductor 53 so that further selectors set on this group are prevented from camping, due to the operation of their 360 relay, in the manner explained above.

When manual switch MS has been set on position 5 the variable upper arm of the Wheatstone bridge is normally open circuited and as a consequence it takes a parallel connection of four 3,000 ohm resistances such as 72, Fig. 3, to conductor 93, corresponding to four selectors camping on this group, to reduce the total resistance of this bridge arm to 750 ohms and thereby cause the operation of this relay. As a result, the 360 relay of further selectors set on this group is caused to operate over the vertical wiper and the respective operators in control of these selectors receive the 60 I. P. M. master busy signal as more particularly described above.

During periods of very light traffic, for example, at night, all-trunks-busy conditions are very rare and if they do occur they will be as a rule, of only momentary duration. At such times the chief operator may set selecting switch MS on its first or reorder position. In this position wiper 484 of switch MS is open circuited even with contact 421 closed, while direct ground is at all times connected to the left hand terminanl of relay 410 by way of wiper 485. Under this condition relay 410 is prevented from operating regardless of how many selectors may be simultaneously resting in the overflow position of level 7. It will further be noted that wiper 488 in this case is connected to 120 I. P. M. flash busy interrupter 65 rather than 30 I. P. M. interrupter 66. As a result ground is returned over conductor 98 at the rate of 120 I. P. M. regardless of whether ATB relay 420 is operated or not, the signalling circuit in the first case extending over contact 427 directly and in the second case over wiper 488 in position 1 and contact 426 in series. Consequently after a selector has reached the overflow position of the group in question the 120 I. P. M. or reorder signal will immediately be returned to the operator in control of the call even though all trunks in this group be busy at this particular instant. As during periods of extremely light traffic this condition is likely to be of only very short duration the operator may be expected to find a trunk in this group idle in spite of the fact that she repeats her attempt immediately upon release of the first connection.

As observed from the above table, position 2 of manual switch MS is used by the chief operator when she wishes to prevent any clamping whatsoever, that is, when the master busy signal is to be irrevocably returned to the operator even though no other selector is camping on the group in question at a given time. With switch MS in position 2 the upper variable bridge arm is constituted by ground through 750 ohm resistance 475, contact 421 and wiper 484, and the lower variable bridge arm is formed by ground through wiper 485, contact 423 and 1,000 ohm resistance 476. As will be recalled from the above description this corresponds to the condition under which polarized relay 410 is designed to operate, and accordingly ground will be connected at contact 411 to PO conductor 53 whenever relay 420 is in released condition, that is whenever an all-trunks-busy condition exists in this group. Any selector set on this group will, therefore, have its 360 relay operated over the vertical wiper so that 60 I. P. M. master busy ground is returned to the controlling operator when the selector reaches its eleventh rotary position.

Position 6 of selecting switch MS has been set aside for testing purposes. In this position 750 ohm ground is normally connected to the right hand terminal of relay 410, viz. by way of resistance 475 and wiper 484, and 1,000 ohm ground is connected to the other terminal of this relay through wiper 485 and resstance 476, both these connections being independent of contacts of ATB relay 420. As will be clear from the above description polarized relay 410 is expected to operate under this condition. If it does overflow lamp 481 at the chief operator's position will be lit and the operator thereby advised of the proper functioning of this relay.

Attention also is called to the fact that in all of positions 1 to 6 a direct connection is set up between conductors 95 and 96 by way of wipers 486 and 487 and the strapping between the respective bank contacts engaged by these wipers in the last-mentioned positions. The talking pair, of any selector resting in the overflow position of this group, therefore, remains terminated through its resistance 73, Fig. 3, by way of selector wipers 88 and 89 in overflow position.

As shown in the above table, positions 7 to 11 of selecting switch MS are used by the chief operator for setting up one of five possible posted delay conditions, depending on the delay expected by her to occur in this particular group. It will be noted from Fig. 4 that in each of these positions wipers 486, 487 of switch MS are connected to one of five pairs of output terminals of common posted delay announcing machine 489, the first pair being connected to positions 7 of switch MS over conductors 491, 492, the second pair to position 8 over conductors 493, 494, the third pair to position 9 over conductors 495, 496, the fourth pair to position 10 over conductors 497, 498 and the fifth pair to positions 11 over conductors 499, 490. Announcing machine 489 may be of any well known type suitable for the reproduction at frequent intervals of short spot announcements, and may for example, comprise five announcing components not shown, each of the general kind disclosed in Peterson Reissue Patent 23,522. In practice a single driving mechanism for all five of these apparatus could, of course, be used, with separate reproducing elements and output terminals for each of the five recorded messages.

It will be noted from Fig. 4 that no connection is established in any of positions 7 to 11 to the right hand terminal of polarized relay 410 by way of wiper 484 and that no connection is available over wiper 485 to the left hand terminal of this relay 410; relay 410, therefore, is prevented from operating at any time while switch MS is on any of its positions 7 to 11. Instead, relay 430 operates in all of these positions from ground connected to wiper 485. Relay 430 in operating at contact 431 causes ground to be connected to conductor 94 for purposes more fully explained hereinbelow; at 432 and 433 closes obvious circuits to posted delay lamps 483 and 471 at the chief operators' and the switchboard operators' positions respectively; and at contact 434 applies ground to PO conductor 53 independently of contacts of ATB relay 420 or polarized relay 410.

The lighting of posted delay lamps 471 at the individual switchboard positions extends a warning to the toll board operators that some posted delay condition exists in this particular group. It is, furthermore, possible to inform the switchboard operators by bulletins passed to them from time to time of the particular delay expected in this and the other toll groups. However, this method by itself is not very flexible nor does it preclude the possibility that an operator may overlook these instructions and erroneously proceed to set up a connection to a group set up for posted delay. In any event, should an operator key up a connection to a group on posted delay she will automatically be informed by the toll selector used in this connection, of the delay set up for this group at that particular moment, namely in the following manner.

When the toll selector involved in such connection is set on the group on posted delay, say the toll group connected to level 7 of the rank of toll selectors, relay 360 in this selector, Fig. 3, operates prior to rotary cut-in, over the following circuit: ground, contact 434 of operated relay 430, PO conductor 53, seventh vertical bank contact, vertical wiper 92, contact 371, lower winding of relay 360, battery. Relay 360 at 364 and 362 closes or prepares locking circuits extending through its upper winding; at 363 disconnects test wiper 90, thereby to force the selector into its overflow position, and at 365 switches EC conductor 296 to master busy interrupter 63, all in the manner explained above for an "excess" selector. As a result the operator's sender again is automatically released as before and link supervisory lamp 201 flashes at the 60 I. P. M. rate, thereby giving a visual master busy indication to the operator. At contact 361 of relay 360 the application of a camping potential to conductor 93 is prevented as in the case of an "excess" selector. Assuming that manual switch MS has been set on its first posted delay position, 7, the following announcing circuit, moreover, is closed to the operator's telephone: 30-minutes-to-one-hour-delay-output, numbered one, of announcing machine 489 (see table), conductors 491, 492, wipers 486, 487 in position 7, conductors 95, 96, selector wipers 88, 89 in rotary position 11 of lever 7, contacts 344, 346, the first of these last-mentioned two contacts being reached through resistance 73, talking conductors 293, 294, talking wipers not shown of link selector 18, contacts 232, 234, contacts 214, 216, and conductors 206, 207, respectively, operator's telephone circuit 202. In this manner, the operator is automatically informed over the talking wipers of the toll selector in their overflow position, of the particular delay condition existing in this toll group at the time the call is made. It will readily be seen that the operation of the system with switch MS set on another of its posted delay positions 7–11 is similar to the one just described except that one of the other delay messages listed in the above table is returned to the operator from the corresponding pair of output terminals of announcing machine 489.

Receipt of the master busy signal, together with one of these quoted delay messages, serves as an instruction to the operator that she is to attempt the completion of a call on a delay basis, and if the particular operator handling the call is qualified to set up such delay calls she will proceed accordingly. If this operator is not so qualified she will pass the call onto a delay or TX operator, together with the instructions received by the first operator from the announcing machine. For this purpose facilities not shown may be provided for enabling the switchboard operators, for instance at an inward position, to directly transfer an incoming call, such as a call received over ring down toll line 1A, to a delay or TX operator. Reference is made in this connection to the section entitled "Transferring a ring-down trunk call from the inward operator position to the TX operator position" of the aforementioned Balzer application. This delay operator may later attend to the various call requests passed onto her, in the order in which she received these requests, or may further dispose of these calls in any manner called for under the existing conditions.

Contact 431 of relay 430 has been provided for the purpose of conditioning those selectors for posted delay operation which are already camping in the eleventh rotary position of the level in question at the time switch MS is set by the chief operator on one of its positions 7 to 11. As the vertical wiper of such selectors is no longer in engagement with its vertical bank an alternative circuit is provided for the operation of relay 360, Fig. 3, which extends over +N wiper 87 of the selector switch when in overflow position. Assuming then that toll selector 19 is already resting in this position the following circuit is closed for relay 360 of this selector when relay 430 operates incident to manual switch MS being moved into, say, position 7: ground, contact 431, conductor 94, wiper 87 in overflow position, contacts 334 and 371, lower winding of relay 360, battery. The functions of relay 360 in operating are the same as previously described except that with selector 19 already in its eleventh rotary position, no further automatic advancement of the selector switch is involved in the present instance. The 60 I. P. M. master busy signal and the recorded announcement from output 1 of announcing machine 489 are accordingly transmitted to the operator and the operator may then release the connection and deal further with this call in the manner described above.

Provisions have been made, in accordance with the present invention, for enabling the switchboard operator to override a posted delay condition encountered by a toll selector used in setting up a connection. This feature is of particular benefit to the special delay operator who has been assigned to handle calls of this nature transferred to her by other toll operators, on a delay basis, for it enables this delay operator if desired to obtain access to idle trunks that may from time to time become available in a group on posted delay in spite of the fact that all other switchboard operators are still barred from access to this group. For this purpose, there is provided as part of the operator's position circuit 28, Fig. 2, a non-locking cut-in key 203 which when momentarily depressed prior to the keying up of the called party's number on the operator's key set, controls a toll selector such as selector 19, Fig. 3, so as to override a posted delay condition set up in the selected toll group in a manner more fully described hereinbelow. This cut-in or override key may be provided at one or more of the delay operator's positions only or it may be provided on all switchboard positions; and in the last-mentioned case the operators would be instructed to use this key only when especially privileged to do so. It would, of course, also be possible to extend this privilege circuitwise to certain operator's positions only, such as by accordingly controlling the ground connection of the individual cut-in keys, say, from a master switch not shown at the chief operator's desk.

Operation of cut-in key 203 at the time sender circuit 30 is coupled with operator's position circuit 28 upon receipt of a call by link circuit 17, results in the operation of relay 250 over the following circuit: ground, cut-in key 203, conductor 298, upper winding of relay 250, battery. Relay 250 upon operating locks from ground by way of contacts 261 and 252 and its lower winding to battery and at contact 251 connects ground by way of 600 ohm resistance 290 to conductor 208 which is connected by way of contacts 245 and 233 to the −L conductor of link selector 18 throughout the holding time of the sender. Assuming that the connection has been extended, responsive to the transmission by sender contact 205 of the first impulse series by way of link selector 18 to toll selector 19, Fig. 3, the following circuit is now completed to override relay 370 upon seizure of the last-mentioned selector: ground, contact 251, resistance 290, conductor 208, contacts 245 and 233, +L conductor and wiper not shown of link selector 18, conductor 294, contact 345, upper winding of relay 370, battery. Relay 370 in operating at contact 372 locks to ground on hold conductor 295 and at 371 disconnects the lower winding of relay 360, thereby preventing the operation of this relay. Thus if selector 19 is now set on its level 7 responsive to the second series of impulses transmitted by the sender, relay 360 is prevented from operating over vertical wiper 92 even though relay 430, Fig. 4, may be operated from ground at wiper 485 of manual switch MS in position 7 and conductor 53 accordingly grounded at contact 434 of this relay.

With relay 360 unoperated the wipers of selector 19, therefore, will be automatically advanced in the normal manner. More particularly, if an idle trunk in the toll group in question is encountered during the advance of the switch, switching relay 340 is permitted to operate by way of contact 363 and test wiper 90 and the selector will accordingly switch through in the manner explained hereinbelow. On the other hand, if all trunks of this group are actually busy at this time the automatic advancement of the switch will continue until its wipers reach the overflow position wherein relays 330 and 340 are caused to operate in series, viz. by way of cam contact 80, and relays 310 and 320 are allowed to release, all as described before. It will be noted that under this condition the 30 I. P. M. camping signal is returned over the incoming end of toll selector 19, namely from ground by way of the 30 I. P. M. interrupter 66 Fig. 4, conductor 480, wiper 488 of switch MS in position 7, contact 426 which is closed under an all-trunks-busy condition, conductor 98, EC wiper 91 of the selector in overflow position, contact 366, non-inductive winding of relay 310, contact **349*f*, and incoming EC conductor 296. The resultant operation of front supervisory lamp 201 at the regular 30 I. P. M. rate, following the forced release of the sender, induces the operator to camp on this busy group in wait for an idle trunk to become available. As soon as this occurs relay 420 reoperates and the flashing of lamp 201 accordingly is changed at contacts 426, 427** to the 120 I. P. M. or reorder rate.

Reverting to the operation of sender circuit 30 during the transmission of the numerical impulses it will be noted that the locking circuit of relay 250 is taken through a contact 261 of a relay 260 the winding of which is shown connected to the third contact in a contact bank of an out-sequence switch CS. This stepping switch which in Fig. 2 is schematically indicated by wiper 297 and its associated contact bank only, serves in a manner well known in the art to sequentially connect the sender proper with the individual digit registers in which the various digits set up on the operator's key set are stored, thereby to control the sequential transmission of these digits. Thus if wiper 297 is advanced into position 3 preparatory to the transmission by sender 30 of the third impulse series following switch through of selector 19 to an idle trunk, relay 260 operates from ground connected to wiper 97 via relay contacts not shown thereby permitting relay 250 to release. Accordingly ground is disconnected at this time from conductor 208 and the +L conductor of the switch train and this clears the talking conductors for the transmission of other signals thereover. In this connection reference is made, for instance, to the system described in the above-mentioned Balzer application in which a ring control signal is transmitted by the sender over the talking conductors of the switch train after all numerical impulse series have been transmitted by the sender. By thus removing the aforementioned override ground from the positive talking conductor at contact 251 prior to the completion of the connection, for example, subsequent to the transmission of the second digital series as shown, interference with the transmission of further control signals such as a ringing control signal is avoided.

It will be understood, of course, that a relay chain may be used instead of a stepping switch to control the sequential transmission of the individual digits by the sender. In that case the contact established by wiper 297 in the third position of the CS switch, Fig. 2, would be in the form of an additional make contact on the third out-sequence chain relay, such as relay R3410, Fig. 34, of Molnar Patent 2,361,313, this patent being referred to in the above-mentioned Balzer application for details of the digit register.

It may be mentioned in passing that application of ground to the +L conductor as a consequence of the operation of cut-in key 203 by the operator, would also have the effect of preventing an "excess" selector from being placed into a no-camping condition in spite of the fact that polarized relay 410 of the selected trunk group set for limited camping may be operated. While relay 410 is arranged to release incident to the opening of the contacts of relay 420 when a trunk in the group in question becomes available it may happen that the all-trunks-busy condition in this group disappears only after relay 360 in the selector has had a chance to operate, from ground by way of contact 411 and the vertical wiper, and lock over its upper winding. However, if override relay 370 in selector 19 has been operated and locked, due to the transmission of ground over the +L conductor upon seizure of the selector as described above, relay 360 is prevented from operating over the vertical wiper and the selector accordingly enabled to seize an idle trunk if such a trunk becomes available during the automatic advancement of the switch.

C. *Operator in distant originating office extends a call over toll line 1B and the tandem intertoll train to toll line 2.*

It remains to briefly describe how an operator in a remote originating exchange benefits from the signalling facilities provided by the present invention if she extends a call by way of the intertoll switch train of the tandem office shown in Fig. 1. For this purpose it may be assumed for example, that the distant originating office also is substantially of the type shown in Fig. 1 and, in particular, includes a dial toll board of the kind shown in this figure; and that toll line 1B whose incoming end at the tandem office is illustrated in Fig. 1 is terminated, at its outgoing end at the distant originating office, in the manner shown for the outgoing end of toll line 2 in Fig. 1. Under this assumption the dial toll board operator in the distant originating office would reach the camp-on-busy selector 19 in the tandem office over a switch train comprising a link selector similar to 18 and a toll selector similar to 19 in the originating office, the toll line interconnecting the originating and tandem offices, and incoming selector 52 and toll selector 19 in the tandem office Fig. 1. The numerical impulses would in this case be transmitted over the EC conductor within the limits of the two switch trains and, say in simplex fashion over one of the toll line pairs, as explained above for toll line 2. Obviously, the connection may in this manner be extended over more than one toll office if desired.

If a trunk in the toll group, level 7, is idle the operator at the originating dial toll board will thus be connected to a four wire toll line, such as 2, outgoing to the terminating office. On the other hand, if all trunks in this group are busy or if a posted delay condition has been set up in this group by the chief operator of the tandem office the originating operator will receive the same signals from toll selector 19 in its overflow position as did the operator at the tandem office toll board in the various cases described in the preceding section. It will be understood, of course, that the various flashing signals returned over the EC conductor of the intertoll switch train in the tandem office are converted into, say, simplex pulses in dial toll trunk circuit 51, Fig. 1, and are then reconverted into EC pulses at the other end of this toll line in the originating office, namely in a dial toll trunk circuit corresponding to trunk circuit 20, Fig. 1.

Referring particularly to the case where the originating toll operator finds the desired toll group in the tandem office on posted delay she will be notified of this condition by the receipt of the 60 I. P. M. master busy signal and the receipt of the corresponding delay announcement from announcing machine 489. As this delay announcement, preferably, also contains an identification of the office, in this particular case the tandem office Fig. 1, in which the delay is encountered the operator at the originating toll board is thus informed of the point in the switch train at which the call has become blocked. The originating operator may accordingly try another route or cause this call to be handled on a delay basis by an operator at her own toll board. Alternatively she may transfer the call to the above-mentioned delay operator at the tandem office toll board for completion in the proper order. For the purpose of such a transfer the originating operator may, for example, have access, over the switch train in her office, to the outgoing end of ring down toll line 1A the incoming or tandem office end of which is shown in Fig. 1; or the intertoll switch train of the tandem office, Fig. 1, may be arranged to give access to the dial toll board of this office. In this last connection reference is made to intertoll selector 112 shown in Fig. 1 of the above Balzer application the first level of which is shown connected to the TX trunk circuit 1000 more particularly illustrated in Figs. 10 and 11 of that application.

While there has been described what is at present considered to be the preferred embodiment of this invention, it will be understood that various modifications may be made therein, and it is contemplated to cover in the appended claims all such modifications as fall within the true spirit and scope of the invention.

What is claimed is:

1. In a telephone system, an operator's position, a lamp at said position, a selector switch of the camp-on-busy type having incoming connections and having a set of wipers and associated contact banks, a plurality of groups of trunks, a group-busy control circuit associated with one of said trunk groups, the trunks of said group being connected to said bank contacts in certain positions of said switch and said control circuit being connected to said bank contacts in an overflow position of said switch succeeding said certain positions, means controlled by a series of impulses received from said operator's position by way of said incoming connections for moving said switch into a preliminary position adjacent said certain positions, a busy signal source, a reorder signal source, means in said switch effective in the case of an all-trunks-busy condition in said group for automatically advancing said switch at the end of said impulse series from said preliminary position over said certain positions into said overflow position and causing a signal from said busy signal source to be returned to said operator in the last-mentioned position, means in said control circuit effective upon a trunk in said group becoming available while said switch is camping in said overflow position for connecting said reorder signal source to a bank contact of said switch in said overflow position, and means controlled by said reorder signal over a circuit extending by way of the last-mentioned bank contact, the corresponding wiper of said switch in said overflow position and said incoming connections for correspondingly operating said lamp.

2. In a telephone system, an operator's position, a lamp at said position, a selector switch of the camp-on-busy type having incoming connections and having a set of wipers and associated contact banks, a plurality of groups of trunks, a group busy control circuit associated with one of said trunk groups, the trunks of said group being connected to said bank contacts in certain positions of said switch and said control circuit being connected to said bank contacts in an overflow position of said switch succeeding said certain positions, means controlled by a series of impulses received from said operator's position by way of said incoming connections for moving said switch into a preliminary position adjacent said certain positions, two intermittent electric-signal sources for returning a busy signal and a reorder signal respectively and both connected to said control circuit, means in said switch effective in the case of an all-trunks-busy condition in said group for automatically advancing said switch at the end of said impulse series from said preliminary position over said certain positions into said overflow position, said busy signal source being connected to one of said bank contacts of said switch in said overflow position, means in said control circuit effective upon a trunk in said group becoming available for switching said bank contact from said busy signal source to said reorder signal source and means controlled by either signal over said bank contact and wiper in said overflow position for correspondingly flashing said lamp.

3. In a telephone system, an operator's position, a lamp at said position, a numerical switch of the camp-on-busy type having a set of wipers and associated contact banks, a plurality of groups of trunks, a group-busy control circuit associated with one of said trunk groups, the trunks of said group being connected to said bank contacts in certain positions of said switch and said control circuit being connected to said bank contacts in an overflow position of said switch succeeding said certain positions, means numerically controlled from said operator's position for moving said switch into a position adjacent said certain positions, means in said switch effective in the case of all trunks in said group being unavailable for thereafter automatically advancing said switch over said certain positions into said overflow position, three sources of relatively distinct electric signals, a manually operable switch associated with said control circuit for pre-selecting the kind of signal or signals to be returned, said control circuit being effective, if said manual switch has been set on one of its positions, for returning to said operator's position a camping signal from said first source by way of one of said bank contacts and wipers of said switch in said overflow position and for automatically substituting for said camping signal a reorder signal from said second source as soon as a trunk in said group becomes available, and being effective if said manual switch has been set on another of its positions for conditioning said numerical switch for returning in said overflow position a final busy signal to the operator's position, and means responsive to any of said electric signals for correspondingly operating said lamp.

4. In a telephone system, the combination as defined in claim 3 and further defined by yet another position of said manual switch, said control circuit being effective, if said manual switch has been set on the last-mentioned position, for immediately returning said reorder signal from said second source regardless of whether a trunk in said group has already become available or not.

5. In a telephone system, a plurality of first traffic channels, a number of second traffic channels accessible in common to said first channels, apparatus for detecting a traffic congestion due to the presence in said first channels of an excessive number of simultaneous calls waiting for completion over said second channels, said apparatus including a resistance network forming the four arms of a Wheatstone bridge, a direct current source connected between two opposite points of said bridge, a polarized relay connected between the other two opposite points, a marking resistance associated with each of said first channels for connection into a bridge arm on one side of said relay, means associated with each first channel effective to control said connection upon the presence in said channel of a call waiting for completion over one of said second channels, selecting means for setting up a given resistance value for a bridge arm on the other side of said relay, thereby to predetermine the number of waiting channels up to which said relay is to remain in its original condition, and means responsive to a change of condition of said relay for giving an indication of said traffic congestion.

6. In a telephone system, a plurality of first traffic channels, a number of second traffic channels accessible in common to said first channels, apparatus for detecting a traffic congestion due to the presence in said first channels of an excessive number of calls waiting for completion over said second channels, said apparatus including a resistance network forming the four arms of a Wheatstone bridge, a direct current source connected between two opposite points of said bridge, a polarized relay connected between the other two opposite points, a marking resistance associated with each of said first channels, means in each of said first channels effective upon the presence therein of a call waiting for completion over one of said second channels for connecting said marking resistance into a bridge arm on one side of said relay, in multiple with the marking resistance of any other waiting first channel, selecting means for setting up a given resistance value for a bridge arm on the other side of said relay, thereby to predetermine the number of waiting channels for which said bridge is at balance, said relay being polarized so as to operate upon said bridge becoming unbalanced due to the resulting resistance value of said first mentioned arm being smaller than corresponds to said condition of balance but not to operate upon said bridge becoming unbalanced in the opposite sense, and means responsive to the operation of said relay for giving an indication of the traffic congestion.

7. In a telephone system, an operator's position, a plurality of numerical switches of the camp-on-busy type, a plurality of groups of outlets accessible in common to said switches, means in each of said switches controlled from said position for setting said switch on a desired one of said groups, apparatus associated with one of said groups for limiting, in the case of an all-outlets-busy condition in said group, the number of said switches permitted to camp on said group in wait for an outlet in said group to become available, said apparatus including a resistance network forming the four arms of a Wheatstone bridge, a direct current source connected between two opposite points of said bridge, a polarized relay connected between the other two opposite points of said bridge, a marking resistance associated with each of said switches, means in each of said switches effective upon said switch being placed in camping condition with respect to said group for connecting said marking resistance into a bridge arm on one side of said relay, in multiple with the marking resistance of any other camping switch, selecting means for setting up a given resistance value for a bridge arm on the other side of said relay, thereby to predetermine the number of camping switches for which said bridge is at balance, said relay being polarized so as to operate upon said bridge becoming unbalanced due to the resulting resistance value of said first mentioned arm being smaller than corresponds to said condition of balance, but not to operate upon said bridge becoming unbalanced in the opposite sense, and means responsive to the operation of said relay for conditioning further switches set on said busy group to return a no camping signal to the operator.

8. In a telephone system, an operator, a plurality of numerical switches of the camp-on-busy type and having a set of wipers and contact banks, a plurality of groups of outlets accessible in common to said switches, means in each of said switches controlled from said operator's position for setting said switch on a desired one of said groups, means effective in the case of an all-outlets-busy condition in one of said groups to automatically advance said switch into an overflow position, means normally responsive to an outlet in said group subsequently becoming available for returning a corresponding signal to said operator, apparatus associated with said group for limiting the number of switches permitted to camp in said overflow position, said apparatus including a resistance network forming the four arms of a Wheatstone bridge, a direct current source connected between two opposite points of said bridge, a polarized relay connected between the other two opposite points of said bridge, a marking resistance associated with each of said switches, means in each of said switches effective upon said switch reaching said overflow position for connecting said marking resistance by way of a wiper of said switch in said overflow position into a bridge arm on one side of said relay, in multiple with the marking resistance of any other camping switch, selecting means for setting up a given resistance value for a bridge arm on the other side of said relay, thereby to predetermine the number of switches for which said bridge is at balance, said relay being polarized so as to operate upon said bridge becoming unbalanced due to the resulting resistance value of said first mentioned arm being smaller than corresponds to said condition of balance but not to operate upon said bridge becoming unbalanced in the opposite sense and means responsive to the operation of said relay for conditioning further switches set on said busy group to return a no camping signal to the operator.

9. In a telephone system, an operator's position, a plurality of numerical switches of the camp-on-busy type and having a set of wipers and contact banks, a plurality of groups of outlets accessible in common to said switches, means in each of said switches controlled from said operator's position for setting said switch on a preliminary position associated with the desired group, said preliminary position preceding the switch positions accommodating the outlets of said group, means effective in the case of an all-outlets-busy condition in said group for automatically advancing said switch, for camping purposes from said preliminary position into an overflow position succeeding said outlet positions, means associated with said group for limiting the number of switches permitted to camp on said overflow position, means in each of said switches for applying an electric marking to said limiting means over a wiper and bank contact of said switch in said overflow position, said limiting means being operated responsive to a certain number of said marking increments being concurrently applied to the last-mentioned means, each of said switches also having contact means closed in said preliminary position and discriminating means connected to said contact means, the discriminating means of any switches set on said preliminary position subsequently to the operation of said limiting means being controlled by said limiting means by way of said contact means so as to prevent a marking increment being applied from said switch to said limiting means in said overflow position.

10. In a telephone system, an operator's position, a numerical switch of the trunk hunting type having a set of wipers and associated contact banks, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, said switch also having contact means associated with said group and closed in an auxiliary position preceding said certain positions, means controlled from said operator's position for selectively moving said switch into said auxiliary position, means for thereafter automatically advancing said switch wipers over said certain positions, means for individually testing said trunks of said group for their idle condition during said advancement, switching means in said control circuit and discriminating means in said switch, said switching means being actuated in accordance with the existence of a predetermined traffic condition in said group to change the condition of said discriminating means by way of said auxiliary contact means and said discriminating means being operative in one of its conditions for preventing said testing means from arresting said automatic advancement upon said wipers encountering an idle trunk in said group, thereby to force said switch into said overflow position.

11. In a telephone system, an operator's position, a selector switch of the two motion type having a set of wipers and associated contact banks, a plurality of groups of trunks, a group busy control circuit associated with one of said trunk groups, trunks of said group being connected to said bank contacts in certain positions of said switch wipers and said control circuit being connected to said bank contacts in an overflow position of said switch wipers, means numerically controlled from said operator's position for imparting a primary motion to said switch, said switch also having an auxiliary wiper and contact bank, said auxiliary wiper successively engaging said auxiliary bank contacts during said primary motion, means for thereafter automatically imparting a secondary motion to said switch to advance the first mentioned wipers over said certain positions, means for individually testing said trunks of said group for their idle condition during said advancement, switching means in said control circuit and discriminating means in said switch, said switching means being actuated in accordance with the existence of a predetermined traffic condition in said group to change the condition of said discriminating means by way of said auxiliary bank and wiper, and said discriminating means being operative in one of its conditions for preventing said testing means from arresting said automatic advancement upon said first mentioned wipers encountering an idle trunk in said group, thereby to force said switch into said overflow position.

12. In a telephone system, an operator's position, a numerical switch of the trunk hunting type having a set of wipers and associated contact banks, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, said switch also having contact means associated with said group and closed in an auxiliary position preceding said certain positions, means controlled from said operator's position for selectively moving said switch into said auxiliary position, means for thereafter automatically advancing said switch wipers over said certain positions, means for individually testing said trunks of said group for their idle condition during said advancement, manually operable means associated with said control circuit and actuated upon the existence of a predetermined condition or conditions of heavy traffic in said group, and discriminating means in said switch controlled by said manually operable means for preventing said testing means from arresting said automatic advancement upon said wipers encountering an idle trunk in said group, thereby to force said switch into said overflow position, said control circuit also being conditioned by said manually operable means to transmit a signal indicative of said traffic condition or conditions to said switch by way of a bank contact and wiper of said switch in said overflow position.

13. In a telephone system, an operator's position, a numerical switch of the trunk hunting type having a set of wipers and associated contact banks, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, means numerically controlled from said operator's position for moving said switch into a preliminary position preceding said certain positions, manually operable means in said control circuit and actuated in the case of extreme traffic congestion in said group, and means in said switch controlled by said manual means for causing said switch to be automatically advanced from said preliminary position into said overflow position irrespective of the idle condition of one or more trunks connected to said certain positions, said control circuit also being conditioned by said manual means to transmit a signal indicative of said traffic congestion to said switch by way of a bank contact and wiper of said switch in said overflow position.

14. In a telephone system, an operator's position, a numerical switch of the trunk hunting type having wiper and contact bank means, including talking wiper and bank means, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, means numerically controlled from said operator's position for moving said switch into a preliminary position preceding said certain positions, manually operable means in said control circuit and actuated in the case of extreme traffic congestion in said group, and means in said switch controlled by said manual means for causing said switch to be automatically advanced from said preliminary position into said overflow position irrespective of the idle condition of one or more trunks connected to said certain positions, said control circuit also being conditioned by said manual means to transmit a signal indicative of said traffic congestion to said switch by way of said talking bank contact and wiper means of said switch in said overflow position.

15. In a telephone system, an operator's position, a numerical switch of the trunk hunting type having a set of wipers and associated contact banks, including a pair of talking wipers and banks, a plurality of groups of trunks, a group busy control circuit associated with one of said trunk groups, trunks of said group being connected to said bank contacts in an overflow position of said switch succeeding said certain positions, means numerically controlled from said operator's position for moving said switch into a preliminary position preceding said certain positions, manually operable means in said control circuit and actuated in the case of an extreme traffic congestion in said group, means in said switch controlled by said manual means for causing said switch to be automatically advanced from said preliminary position into said overflow position irrespective of the idle condition of one or more trunks connected to said certain positions, and an announcing machine having recorded therein information indicative of the delay expected in view of said traffic congestion, said control circuit also being conditioned by said manual means to connect the output of said machine to the talking bank contacts of said switch in said overflow position, thereby to transmit said recordings by way of the talking wipers of said switch in said overflow position to said operator.

16. In a telephone system, an operator's position, a numerical switch of the trunk hunting type having a set of wipers and associated contact banks, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, means numerically controlled from said operator's position for moving said switch into a preliminary position preceding said certain positions, means effective in the case of an all-trunks-busy condition in said group for causing said switch to be automatically advanced from said preliminary position into said overflow position, means in said control circuit for transmitting to said operator, by way of a bank contact and wiper of said switch in said overflow position, a busy signal dependent on the continued existence of said all-trunks-busy condition, manually operable means in said control circuit and actuated in the case of extreme traffic congestion in said group for exerting a corresponding electrical control on said switch by way of one of said bank contacts and wipers in said overflow position, and means in said switch responsive to the last mentioned control for conditioning said switch for the transmission to said operator of a final busy signal.

17. In a telephone system, an operator's position, a numerical switch of the trunk hunting type having a set of wipers and associated contact banks including a number of voice current carrying wipers and banks, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, means numerically controlled from said operator's position for moving said switch into a preliminary position preceding said certain positions, means effective in the case of an all-trunks-busy condition in said group for causing said switch to be automatically advanced from said preliminary position into said overflow position, means in said control circuit for transmitting to said operator by way of a bank contact and wiper of said switch in said overflow position, a busy signal dependent on the continued existence of said all-trunks-busy condition, manually operable means in said control circuit and actuated in the case of an extreme traffic congestion in said group for exerting a corresponding electrical control on said switch by way of one of said voice current carrying bank contacts and wipers in said overflow position, and means in said switch responsive to the last-mentioned control for conditioning said switch for the transmission to said operator of a final busy signal.

18. In a telephone system, an operator's position, a switch having incoming connections and a set of wipers and associated contact banks, said switch being of the type having a selective movement and a subsequent automatic trunk hunting movement, a plurality of groups of trunks, a group busy control circuit associated with one of said trunk groups, trunks of said group being connected to said bank contacts in certain positions of said switch, means controlled from said operator's position over said incoming connections for selectively moving said switch into a position adjacent said certain positions, means for individually testing said trunks of said group for their idle condition during said automatic movement, said switch also having auxiliary contact means closed at the end of said selective movement and discriminating means connected to said contact means, manually operable means associated with said control circuit and actuated in the case of an extreme traffic congestion, said discriminating means being conditioned by said manual means by way of said contact means for preventing an idle one of said trunks from being seized under the control of said testing means, override means at said operator's position, and a circuit controlled by said override means and extending over said incoming connections for rendering said discriminating means ineffective to prevent such seizure, thereby enabling the operator to gain access to an idle trunk despite the actuation of said manual means.

19. In a telephone system, an operator's position, a switch of the trunk hunting type having a set of wipers and associated contact banks, a plurality of groups of trunks, a group busy control circuit associated with one of said trunk groups, trunks of said group being connected to said bank contacts in certain positions of said switch and said control circuit being connected to said bank contacts in an overflow position of said switch succeeding said certain positions, said switch also having contact means associated with said group and closed in an auxiliary position preceding said certain positions, means controlled from said operator's position for selectively moving said switch into said auxiliary position, means for thereafter automatically advancing said switch over said certain positions, means for individually testing said trunks of said group for their idle condition during said advancement, manually operable means associated with said control circuit and actuated in the case of an extreme traffic congestion in said group, discriminating means in said switch controlled by said manual means for preventing said testing means from arresting said automatic advancement upon said wipers encountering an idle trunk in said group, thereby to force said switch into said overflow position, override means at said operator's position, and a circuit controlled by said override means prior to the beginning of said automatic advancement and extending over said incoming connections for rendering said discriminating means ineffective to prevent such arresting.

20. In a telephone system, an operator's position, a train of switches, impulsing means at said operator's position for setting up a connection over said switch train, said switch train comprising a numerical switch having a set of incoming conductors, including a pair of talking conductors, and a set of wipers and associated contact banks, said switch being of the type having a selective movement and a subsequent automatic trunk hunting movement, means controlled by said impulsing means over said incoming conductors for selectively moving said switch into a position adjacent said certain positions, means for individually testing said trunks of said group for their idle condition during said automatic movement, said switch also having auxiliary contact means closed at the end of said selective movement and discriminating means connected to said contact means, manually operable means associated with said control circuit and actuated in the case of an extreme traffic congestion, said discriminating means being conditioned by said manual means by way of said contact means for preventing an idle one of said trunks from being seized under the control of said testing means, override means at said operator's position, a circuit closed by said override means and extending over one of said incoming talking conductors for rendering said discriminating means ineffective to prevent such seizure, and means controlled by said impulsing means for opening the last mentioned circuit prior to the completion of the connection over all the switches of said train.

21. In a telephone system, an operator's position, a plurality of numerical switches of the camp-on-busy type, a plurality of groups of outlets accessible in common to said switches, means in each of said switches controlled from said position for setting said switch on a desired one of said groups, a group busy control circuit associated with one of said groups, said control circuit including a polarized relay for limiting, in the case of an all outlets busy condition in said group, the number of switches permitted to camp on said group in wait for an outlet in said group to become available, a first and a second circuit for said relay controlling the energization of said relay in one or the other sense, a marking resistance associated with each of said switches, means in each of said switches effective upon said switch being placed in camping condition with respect to said group for controlling the connection of said marking resistance into said first circuit, said control circuit also including a plurality of pre-setting resistances and a multi-position selecting switch having a number of positions for controlling the connection of a pre-setting resistance of a given value into said second circuit, thereby to predetermine the number of camping switches for which the relay is substantially unenergized, said relay being polarized so as to operate, only upon its energization in a sense corresponding to the number of camping switches exceeding said predetermined number, for conditioninig further switches set on said busy group to return a no-camping signal to the operator, a number of signal sources indicative of the existence of a condition of extreme traffic congestion and each connected up in a corresponding number of other positions of said selecting switch, and means in said numerical switches controlled by said control circuit independently of said all outlets busy condition for conditioning a numerical switch set on said group to transmit to the operator the congestion signal connected up by said selecting switch.

22. A numerical switch of the trunk hunting type having incoming connections and having a set of wipers and associated contact banks, a group of trunks, trunks of said group being connected to said bank contacts in certain positions of said switch, said switch also having contact means associated with said group and closed in an auxiliary position preceding said certain positions, means controlled over said incoming connections for selectively moving said switch into said auxiliary position, means for thereafter automatically advancing said switch wipers over said certain positions, means for individually testing said trunks of said group for their idle condition during said advancement and arresting said wipers upon an idle trunk when found, signalling means connected to said bank contacts in an overflow position following said certain positions and discriminating means in said switch, said signalling means being actuated in accordance with the existence of a predetermined traffic condition in said group to control the condition of said discriminating means by way of said auxiliary contact means and said discriminating means being operative in one of its conditions for preventing said testing means from arresting said automatic advancement upon said wipers encountering an idle trunk in said group, thereby to force said switch wipers into said overflow position, and means effective upon the arrival of said wipers in the last-mentioned position for switching at least some of said wipers through to said signalling means.

References Cited in the file of this patent

UNITED STATES PATENTS

| | | |
|---|---|---|
| 2,097,165 | Stokely | Oct. 26, 1937 |
| 2,151,767 | Hovland | Mar. 28, 1939 |